United States Patent
Jazdzewski

(10) Patent No.: US 6,968,536 B2
(45) Date of Patent: Nov. 22, 2005

(54) FRAME COMPONENT CONTAINER

(75) Inventor: Charles Jazdzewski, Soquel, CA (US)

(73) Assignee: Borland Software Corporation, Scotts Valley, CA (US)

( * ) Notice: Subject to any disclaimer, the term of this patent is extended or adjusted under 35 U.S.C. 154(b) by 513 days.

(21) Appl. No.: 09/906,400

(22) Filed: Jul. 16, 2001

(65) Prior Publication Data

US 2002/0083415 A1 Jun. 27, 2002

Related U.S. Application Data

(60) Provisional application No. 60/225,054, filed on Aug. 14, 2000, and provisional application No. 60/218,282, filed on Jul. 14, 2000.

(51) Int. Cl.[7] .................................................. G06F 9/44
(52) U.S. Cl. ........................ 717/106; 717/107; 717/108; 717/109; 717/110; 717/113; 717/116
(58) Field of Search ................................ 717/106, 107, 717/108, 109, 110, 113, 116

(56) References Cited

U.S. PATENT DOCUMENTS

| | | | | |
|---|---|---|---|---|
| 5,437,025 A | * | 7/1995 | Bale et al. | 707/103 R |
| 5,487,141 A | * | 1/1996 | Cain et al. | 345/764 |
| 5,652,884 A | * | 7/1997 | Palevich | 707/100 |
| 5,680,619 A | * | 10/1997 | Gudmundson et al. | 717/108 |
| 5,710,926 A | * | 1/1998 | Maurer | 717/108 |
| 5,727,195 A | * | 3/1998 | Nakatsuyama | 707/1 |
| 5,812,135 A | * | 9/1998 | Kotchey | 707/100 |
| 5,842,020 A | * | 11/1998 | Faustini | 717/111 |
| 6,002,867 A | | 12/1999 | Jazdzewski | 395/701 |
| 6,085,034 A | * | 7/2000 | Danforth | 717/108 |
| 6,321,372 B1 | * | 11/2001 | Poirier et al. | 717/110 |
| 6,446,077 B2 | * | 9/2002 | Straube et al. | 707/103 Y |
| 6,542,884 B1 | * | 4/2003 | Soderberg et al. | 707/1 |
| 6,678,880 B1 | * | 1/2004 | Roddy | 717/108 |

* cited by examiner

*Primary Examiner*—Tuan Dam
*Assistant Examiner*—Qamrun Nahar
(74) *Attorney, Agent, or Firm*—Darby & Darby

(57) ABSTRACT

A system and methods for rapidly incorporating changes to a project is described. An object derived from a frame component container is embedded into a project, with the frame component container being freely changeable as desired. Any changes made to the frame component container are automatically included, by inheritance, into the source files of the project. Preferably, the method synchronizes on a display all instances of the object derived from the frame component container to the frame component container. The development system includes a computer and an interface for creating frame objects having components. Software permits the creation of descendant frame objects from an ancestor frame, propagation of modifications of the ancestor frame to each descendant frame object, notification of the descendant frame objects that its corresponding ancestor frame has been modified, and synchronization on a display of all of the descendant frames with any modifications to the components of the ancestor frame.

29 Claims, 26 Drawing Sheets

FIG. 8C

FRAME COMPONENT CONTAINER

CROSS-REFERENCE TO RELATED CASES

This patent application claims the benefit of priority under 35 U.S.C § 119 from U.S. Provisionsl Application Ser. No. 60/225,054, file Aug. 14, 2000, entitled "A Data Module Design System and Frame Component Container," and from U.S. Provisional Application Ser. No. 60/218,282, filed Jul. 14, 2000, entitled "A Data Module Design System and Frame Component container," each of which is incorporated by reference as if set forth in its entirety herein.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to improvements in frame component contaimers for use in object orientated environments, and, more particularly, to owmership mechanisms for automatic instantiation and destruction of components and a parent-child relationships of frames.

BACKGROUND OF THE INVENTION

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program written in the high-level language is called the "source code" or source program. The ultimate output of the compiler is an intermediate module or "object module," which includes instructions for execution by a target processor. In the context of Turbo Pascal and Object Pascal, products of Borland Software Corporation, Scotts Valley, Calif., the intermediate module is a Pascal "unit" (e.g., .TPU file). Although an object module includes code for instructing the operation of a computer, the object module itself is not usually in a form which may be directly executed by a computer. Instead, it must undergo a "linking" operation before the final executable program is created.

Linking may be thought of as the general process of combining or linking together one or more compiled object modules or units to create an executable program. This task usually falls to a program called a "linker." In typical operation, a linker receives, either from the user or from an integrated compiler, a list of modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (typically an .EXE file) which, after testing and quality assurance, is passed to the user with appropriate installation and usage instructions.

"Visual" development environments, such as Borland's Delphi™., Microsoft.R™. Visual Basic, and Powersoft's PowerBuilder™., are rapidly becoming preferred development tools for quickly creating production applications. Such environments are characterized by an integrated development environment (IDE) providing a form painter, a property getter/setter manager ("inspector"), a project manager, a tool palette (with objects which the user can drag and drop on forms), an editor, a compiler, and a linker. In general operation, the user "paints" objects on one or more forms, using the form painter. Attributes and properties of the objects on the forms can be modified using the property manager or inspector. In conjunction with this operation, the user attaches or associates program code with particular objects on screen (e.g., button object); the editor is used to edit program code which has been attached to particular objects.

At various points during this development process, the user "compiles" the project into a program which is executable on a target platform. For Microsoft Visual Basic and Powersoft PowerBuilder, programs are "pseudo-compiled" into p-code ("pseudo" codes) modules. Each p-code module comprises byte codes which, for execution of the program, are interpreted at runtime by a runtime interpreter. Runtime interpreters themselves are usually large programs (e.g., VBRUNxx.DLL for Visual Basic) which must be distributed with the programs in order for them to run. In the instance of Delphi, on the other hand, programs are compiled and linked into true machine code, thus yielding standalone executable programs; no runtime interpreter is needed.

To facilitate software development, it is highly desirable to reuse software components or modules—ones which have been tested and debugged. In form-based, visual development environments in particular, there exists a high degree of functionality which is duplicated from one project to another. Often, however, the core functionality must be modified. Even if substantial modifications are not dictated by system design, one nevertheless still must make substantial modifications in order to adapt the functionality to a new project. Today, programmers typically cut and paste from one project to another. The approach is problematic, however. If one desires to make a core change to the underlying functionality, one is required to go to each individual project to which the code has been copied and manually enter those modifications. There is no mechanism to propagate such a change among projects.

These problems are compounded by the use of forms in projects. Each form in a project typically includes a form initial state, which exists in addition to the code. A difficulty arises in how to propagate a change from the base form to projects having dependent forms. Another problem which arises with the current approach to copying forms among projects is that of versioning. Here, as each form (and its code) is propagated from one project to another, it often undergoes some modification. Since a single base form is not maintained from which dependent forms propagate, a proliferation of the form occurs which leads to increased difficulty in managing the development process.

There has been some effort to address these problems with the use of "form inheritance." Current form inheritance approaches have themselves led to additional problems. Form inheritance allows users to derive forms from "ancestor" forms, inheriting their components, properties, and code as a starting point. Inheritance allows the user to create a library of standard form templates. A change made to an ancestor form is included in any descendant forms. For a discussion of form inheritance, see U.S. Pat. No. 6,002,867 of inventor Jazdzweski.

The U.S. Pat. No. 6,002,867 patent describes a system and method in which visual form inheritance is described. Visual form inheritance extends the utility of forms, but does not provide a developer with the ability to directly reuse parts of a form in another form. Also, form inheritance does not provide a modular construct useable in building more complex forms and applications free of re-coding.

A limitation of form inheritance as a development tool, however, is that multiple forms cannot be aggregated into a single form. Instead, some recoding is involved to include components from different forms together onto a single form.

There is a need to provide a developer with the ability to aggregate parts of forms into a new form. The present invention provides such improvements by providing a new construct called a frame component container, which includes inheritance-like characteristics to isolate the influence of changes to descendants.

SUMMARY OF THE INVENTION

In accordance with a salient aspect of the invention, a method for creating a hierarchal frame component container with inheritance features is described. A frame has an ownership mechanism for automatic instantiation and destruction of components and a parent-child relationship for synchronization of component properties. A frame can be included in the component palette and can be nested within forms, other frames, as well as other container objects. Once created, the frame continues to function as a unit and inherit changes from the components it contains, including any other frame therein.

In accordance with one aspect of the invention, a method for rapidly incorporating changes to a project is described. In this method, an object derived from a frame component container is embedded into plural forms. The frame component container can be changed as desired. Changes made to the frame component container are automatically included, by inheritance, into the source files of the forms. Preferably, the method synchronizes on a display all instances of the object derived from the frame component container to the frame component container.

In accordance with another aspect of the invention, a method for rapidly incorporating changes to multiple, discrete changes is described. In this method, an object derived from a frame component container is embedded into at least one form of each project under development. Again, the frame component container can be changed as desired and changes made to the frame component container shall be automatically included, by inheritance, into the source files of the forms. Preferably, this method synchronizes on a display all instances of the object derived from the frame component container to the frame component container.

In accordance with yet another aspect of the invention, a method for assisting a user in creating an application program in a form-based development system is described. The method includes the steps of creating an ancestor frame and embedding a descendant of that frame into a form. The descendant frame inherits a set of components and a set of component properties from the ancestor frame. Modification of the descendant frame can be achieved by overriding a value stored for one property. Only the values for those properties that have been overridden are stored. The method includes the further steps of modifying a component of the ancestor frame and propagating each modified property value to all descendant frames and synchronizing on a display each of the descendant frames with any modifications that were made to any components of the ancestor frame.

According to still another aspect of the invention, a method is provided for use in a form-based development system that assists a user in creating an application. The method includes the initial steps of creating an ancestor frame comprising a set of components each having a set of properties and embedding one or more descendant frames into a form. The descendant frames each have a set of components that are inherited from the ancestor frame. At least one value of a property of one or more of the descendant frames overridden and only the new values for any modified properties are stored. Also, a component of the ancestor frame is modified, and, in repsonse to that step, a notification is issued to each component of any descendant frame that inherits from the so-modified component. Any such modifications to any of the descendant frames is synchronized on a display. In response to receiving a notification of such a modification, each notified component of a descendant frame is updated to have the values for those properties of the ancestor which have not been overridden at the descendant frame.

According to a further aspect of the invention, a method for assisting a user with creating an application program is provided in a form-based development system. The method includes the steps of creating an ancestor frame comprising a set of components, each component having a set of properties; embedding at least one descendant frame into a form, the descendant frames having a set of components inherited from the ancestor frame, modifying the descendant frames by overriding a value stored for at least one property; storing values for only those properties of the descendant frames which have been overridden; creating a new component at the ancestor frame; synchronizing on a display all of descendant frames with any modifications that were made to components of the ancestor frame; and, in response to the creating step, creating at each descendant a corresponding new component.

Another aspect of the invention concerns a development system which comprises: a computer having a processor and a memory; an interface for creating frame objects having components; and software means for creating a descendant frame object from an ancestor frame object which includes a software means for automatically propagating to each descendant frame object so-created modifications which occur at the ancestor frame object which includes software means for notifying a descendant frame object that its corresponding ancestor frame object has been modified; and software means for synchronizing on a display all of the descendant frames with any modifications to the components of the ancestor frame.

In the system of the present invention, the user can derive forms from other "ancestor" forms, inheriting their components, properties, and code as a starting point for one's own forms. During system operation, the user selects an "Inherit" menu choice for indicating to the system that the form to be created inherits from an existing ancestor form. Ancestor forms can be any forms already contained in an existing projector in an "object repository" provided by the system. Form inheritance allows the user to create a library of standard form templates, either within a single application or across an entire suite of applications. Any changes made to the ancestor form immediately appear in the descendant forms. Further, the use can customize each form type so derived while still retaining the ability to modify the standard form and have those changes reflected in the derived forms.

The "object repository" serves as a means for sharing and reusing forms and projects. In an exemplary embodiment, the repository itself is implemented as a text file containing references to forms, projects, and other objects. By adding forms, dialog boxes, and data modules to the object repository, the user makes these objects available to other projects. For example, the user can have all of his or her projects use the same about box by placing a reference to a particular about box in the object repository. When the user creates a new form, the user has the option of either starting with a blank form or starting from an already-designed form type. When the user starts from an already-designed type, he or she can either copy that form, inherit from it, or use it. When a form inherits from another form, the system creates a reference to the ancestor form and only generates additional code for adding components and event handlers. If several forms in a project are inherited from the same ancestor, they share the inherited code.

Typically, at some point the user will want to further customize a descendant form, such as adding a group box component to the descendant. The descendant can be modified with no effect on the ancestor. Still further, the user can customize inherited components on the descendant form, without effect on the ancestor form's corresponding components. For instance, the user can move screen buttons on the descendant form to a new location. At the same time, however, corresponding screen buttons on the ancestor remain unaffected. In this instance, the user has "overridden" the property values inherited from the ancestor by the descendant form. When particular properties have been overridden with new values, further changes to those property values at the ancestor will not propagate to the descendant. If, for instance, movement of the ancestor's screen buttons, at this point, to a new location will not effect the position of the descendant screen buttons, as propagation of the ancestor's property values is blocked by the overriding which occurred at the descendant. Other properties of the descendants, on the other hand, still inherit from corresponding objects of the ancestor, so long as they are not also overridden.

These and other aspects, features and advantages of the present invention can be appreciated from the following Detailed Description of Certain Preferred Embodiments and accompanying Drawing and Figures.

BRIEF DESCRIPTION OF THE DRAWINGS

FIG. 8C is a bitmap screenshot illustrating the use of frame inheritance.

DETAILED DESCRIPTION OF A PREFERRED EMBODIMENT

Figure 1A:
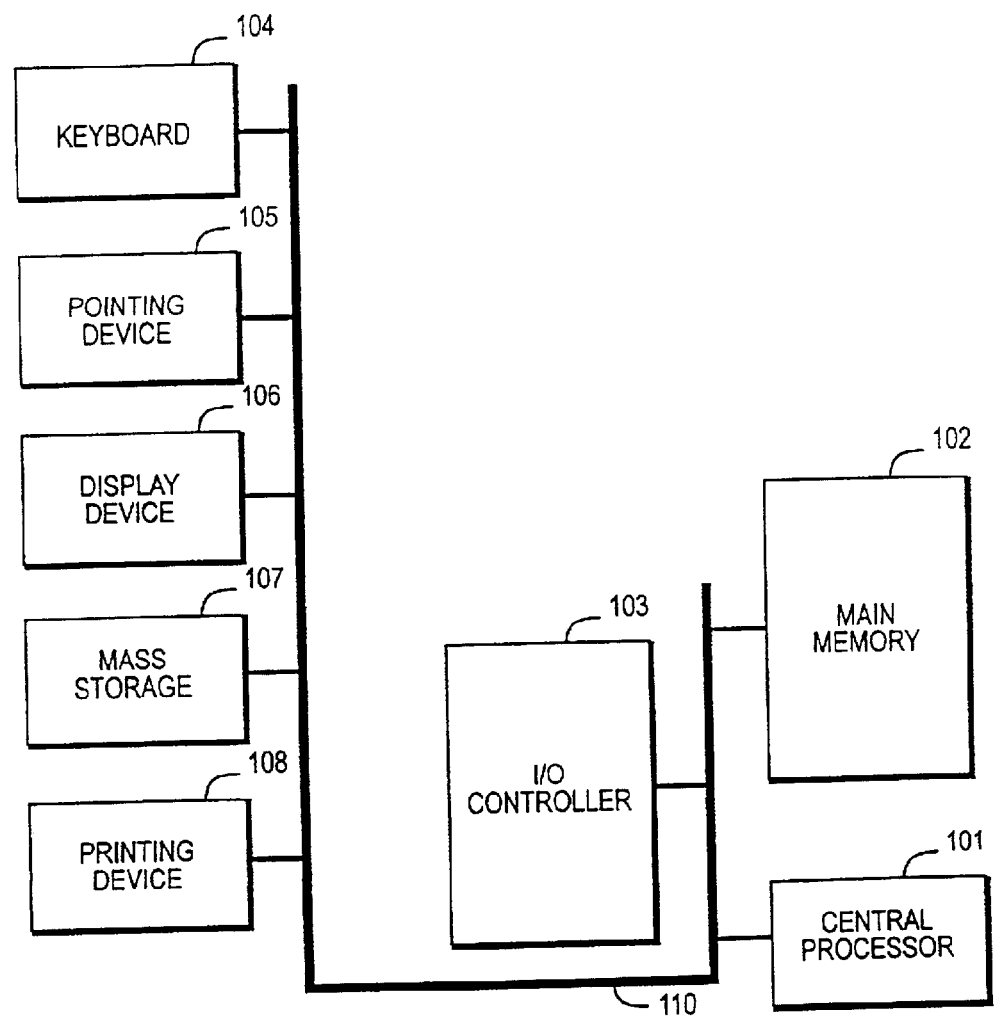
FIG. 1A is a block diagram of a computer system in which the present invention may be embodied.

By way of overview and introduction, the invention provides new functionality to integrated development environments (IDEs). In the preferred embodiment, a container known as a "frame" or "frame component container" is savable for re-use on a component palette provided in the IDE and can contain both visual and non-visual components. A frame is defined in terms of its components independent of any form. Consequently, frames differ from forms that have been available for use by developers because multiple frames can be placed into a form whereas one form cannot be included in another by convention. Changes made to the definition of a frame configured in accordance with the preferred embodiment will propagate the embedded (descendant) frame. However, changes to the embedded frame will not backchain (propagate upward) to the frame's definition (ancestor). Thus, unlike a template, a later change in any project parameters can be implemented by changing the frame, yet embedded frames can still be modified on a case-by-case basis without affecting the ancestral frame or embedded decedents.

Frames are created by declaring a new class that descends from a higher class, such as Tform or some other frame that was selected by the developer. The declaration of a new class is automatically performed upon adding a frame into a project. By placing the frame on a form, whether directly or indirectly through another container object (e.g., panels and scroll boxes) or frame, the frame can be used in an application (see frame 430A in FIG. 4D). Once added to the project under design, it can be displayed in any number of views (e.g., a hierarchy, component, or data diagram view as described in the aforementioned Data Module Design System patent application) that the IDE supports. Multiple frames can be included in the same form, e.g.: (1) the frame is in a "sub-form" with special features; (2) the user can pick and choose which to include; and (3) the same frame can be in forms with different ancestors (i.e., different applications).

After an empty frame is created, other components (including other frames) can be dropped into the new frame. The frame can include non-visual components as well as visual components. See buttons 520 in FIG. 4D. Exemplary non-visual components include tables, databases, datasets, image lists, datasources, data-access components, and data-aware controls. Exemplary visual components include screen buttons, tool bars, status bars, group boxes, dialog boxes, and other objects with which users can interact. Frames differ from the forms described in U.S. Pat. No. 6,002,867 of inventor Jazdzweski in that the frame described in the '867 patent are unable to be nested within other frames and therefore provide only limited flexibility to the developer. The disclosure of the '867 patent is highly pertinent to the underlying principles of the present invention insofar as it provides details on the concepts of property inheritance and modification, and the '867 patent is hereby incorporated by reference as if set forth in its entirety herein. However, as a dramatic departure from basic form inheritance, the multiple frames constructed in accordance with the preferred embodiment can nest within a single form and thereby provide a degree of modularity not achievable with forms.

Although not necessary, it is usually best to save frames as part of a project. A project can be created that contains only frames.

A frame can be used, for example, to assemble a group of data-access components and data-aware controls for repeated use in multiple applications. These components are included in the frame through direct action by the user through a user interface, for example, by a drag-and-drop operation from one window to another or by retrieval from a component list window. The frame provides a convenient construct in which required changes to any of its components can be made in one place (namely, in the frame 420A), with changes being propagated without user action to the source code of the embedded descendants' projects. On the other hand, any modifications to an embedded frame can be made to tailor a given project, without affecting the original frame or any other embedded descendants of the tailored frame. Consequently, frames can simplify maintenance and use resources more efficiently.

EXAMPLE

A graphic file (e.g., bitmap image) included in a database is to be used repeatedly in an application. Without the use of frames, the image would ordinarily be loaded into a Picture property of a TImage control. If the same image is to be used repeatedly in one application, each Image object placed on a form will result in another copy of the graphic being added to the form's resource file. However, with the assistance of the frame construct of the preferred embodiment, the Image object can be included into a frame, with the graphic loaded into the frame, and the frame incorporated wherever the graphic is to appear. This arrangement results in smaller form files and has the added advantage of allowing changes to the graphic everywhere it occurs simply by modifying the Image on the original frame.

General Architecture

The following description will focus on a preferred embodiment of the present invention (and certain alternatives) embodied in a visual development environment running on an Intel 80.times.86-compatible computer operating under an event-driven operating system, such as the Microsoft.RTM. Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

A. System Hardware

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., removable disk, floppy disk, fixed disk, optical disk (including CD-ROM), and the like). Additional input/output devices, such as a printing device 108, may be provided with the system 100 as desired. As shown, the various components of the system 100 communicate through a system bus 110 or similar architecture. In a preferred embodiment, the system 100 includes an IBM-compatible personal computer, available from a variety of vendors (including IBM of Armonk, N.Y.).

B. System Software

Figure 1B:
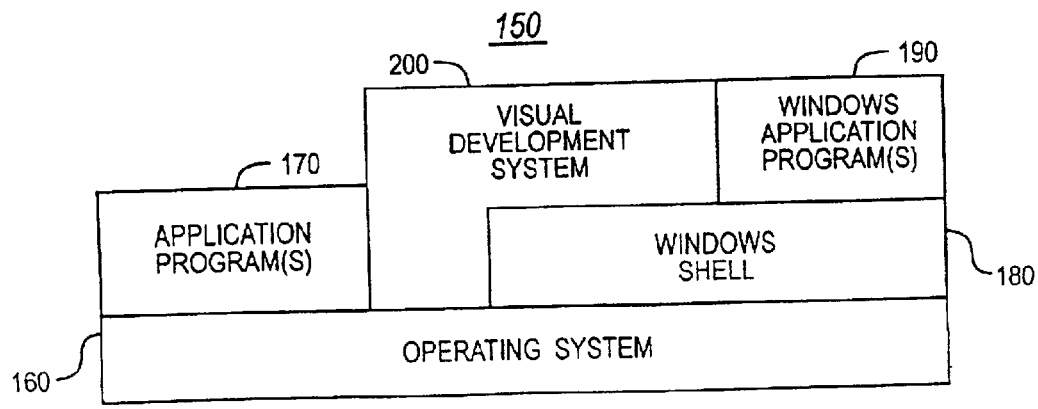
FIG. 1B is a block diagram of a software system provided for directing the operation of the computer system of FIG. 1A.

Illustrated in FIG. 1B, a computer software system 150 is provided for directing the operation of the computer system 100. Software system 150, which is stored in system memory 102 and/or on disk storage 107, includes a kernel or operating system (OS) 160 and a windows shell or interface 180. One or more application programs, such as application programs 170 or windows applications programs 190, maybe "loaded" (i.e., transferred from storage 107 into memory 102) for execution by the system 100. OS 160 and shell 180, as well as application software 170, 190, include an interface for receiving user commands and data and displaying results and other useful information. Software system 150 also includes a visual development system 200 of the present invention for developing system and application programs. As shown, the development system 200 includes components which interface with the system 100 through windows shell 180, as well as components which interface directly through OS 160.

In a preferred embodiment, operating system 160 includes MS-DOS and shell 180 includes Microsoft.R™. Windows, both of which are available from Microsoft Corporation of Redmond, Wash. Alternatively, components 160 and 180 can be provided by Microsoft Windows 95/Windows NT. Those skilled in the art will appreciate that the system may be implemented in other platforms, including Macintosh, UNIX, and the like. Development system 200, on the other hand, includes Delphi.™., available from Borland International of Scotts Valley, Calif. (Part No. HDA1320USCU180). Application software 170, 190 can be any one of a variety of software applications, such as word processing, database, spreadsheet, text editors, and the like, including those created by the development system 200.

C. Development System

Figure 2:
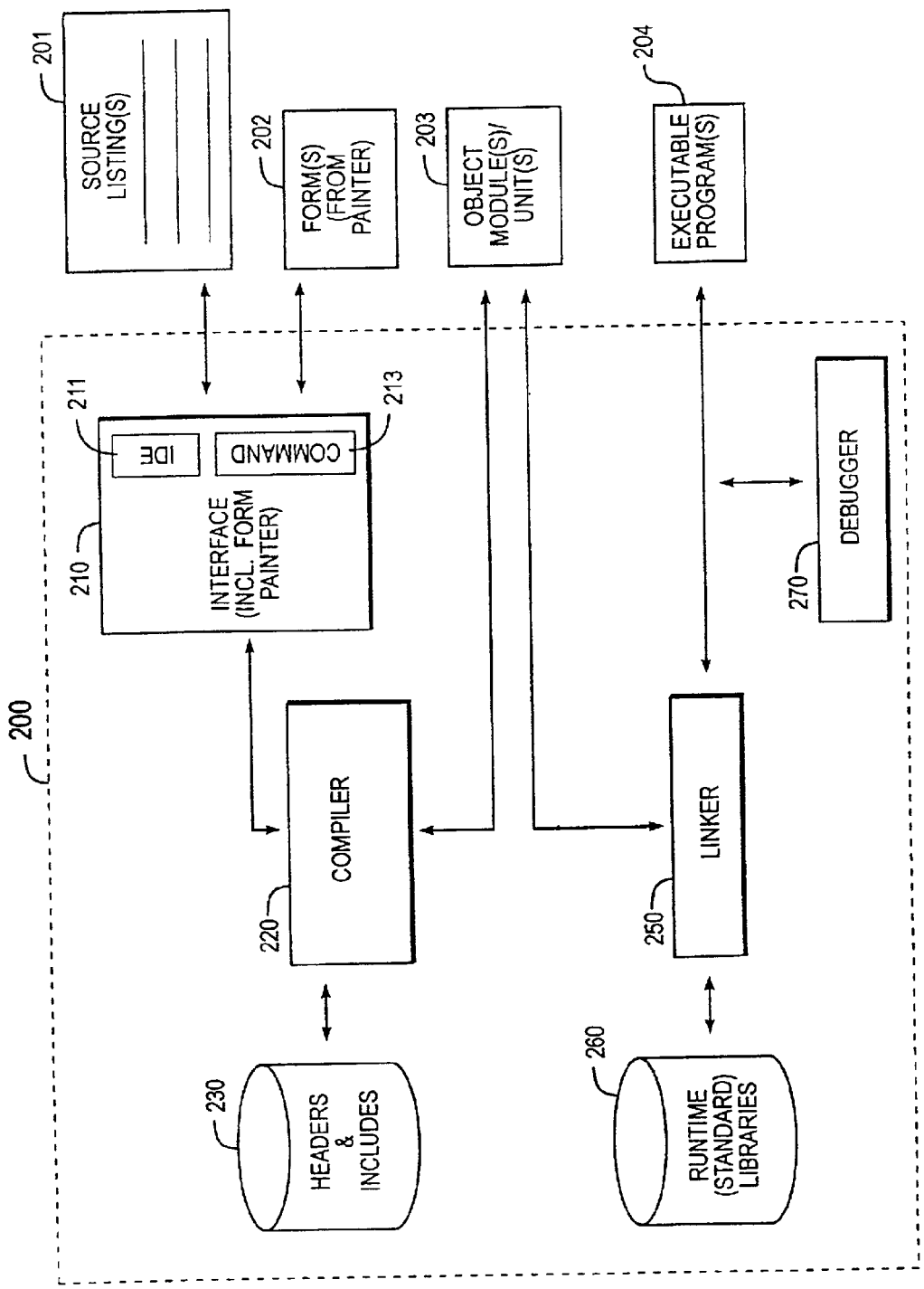
FIG. 2 is a block diagram of a visual development system of the preferred embodiment which includes a compiler, a linker, and an interface.

Shown in further detail in FIG. 2, the visual development system 200 of the present invention includes a compiler 220, a linker 250, and an interface 210. Through the interface, the developer user "paints" forms 202 with objects and supplies source listings 201 to the compiler 220. Interface 210 includes both command-line driven 213 and Integrated Development Environment (IDE) 211 interfaces, the former accepting user commands through command-line parameters, the latter providing menuing equivalents thereof. From the source code or listings 201, forms 202, and headers/includes files 230, the compiler 220 "compiles" or generates object module(s) or "units" 203. In turn, linker 250 "links" or combines the units 203 with runtime libraries 260 (e.g., standard runtime library functions) to generate program(s) 204, which may be executed by a target processor (e.g., processor 101 of FIG. 1A). The runtime libraries 260 include previously-compiled standard routines, such as graphics, I/O routines, startup code, math libraries and the like.

A description of the general operation of development system 200 is provided in the manuals accompanying Delphi.™.: Users Guide (Part No. HDA1320WW21772), and Components Writer's Guide (Part No. HDA1320WW21773). Further description can be found in Object Pascal Language Guide (Part No. HDA1320WW21774) and Visual Component Library Reference (Part No. HDA1320WW21775). The disclosures of each of the foregoing (which are available directly from Borland International of Scotts Valley, Calif.) are hereby incorporated by reference. Description of the use of "method pointers" in the system for implementing event handling, can be found in the commonly-owned, co-pending application entitled DEVELOPMENT SYSTEMS WITH METHODS FOR TYPE-SAFE DELEGATION OF OBJECT EVENTS TO EVENT HANDLERS OF OTHER OBJECTS, U.S. Pat. No. 6,185,728, issued Feb. 6, 2001, the disclosure of which is hereby incorporated by reference.

Operation (i.e., "compilation") by a compiler, such as compiler 220, is generally driven by its two main components: a front end and a back end. The "front end" of the compiler parses the source program and builds a parse tree—a well known tree data structure representing parsed source code. The "back end" traverses the tree and generates code (if necessary) for each node of the tree, in a post-order fashion. For an introduction to the general construction and operation of compilers, see Fischer et al., Crafting a Compiler with C, Benjamin/Cummings Publishing Company, Inc., 1991, the disclosure of which is hereby incorporated by reference. Further description of the back end of the compiler is provided in commonly-owned U.S. Pat. No. 5,481,708, issued Jan. 2, 1996. Description of a linker, such as Borland's TurboLinker, is provided in commonly-owned U.S. Pat. No. 5,408,665, issued Apr. 18, 1995. The disclosures of each of the foregoing patents are hereby incorporated by reference.

D. General Development Interface

Figure 3:
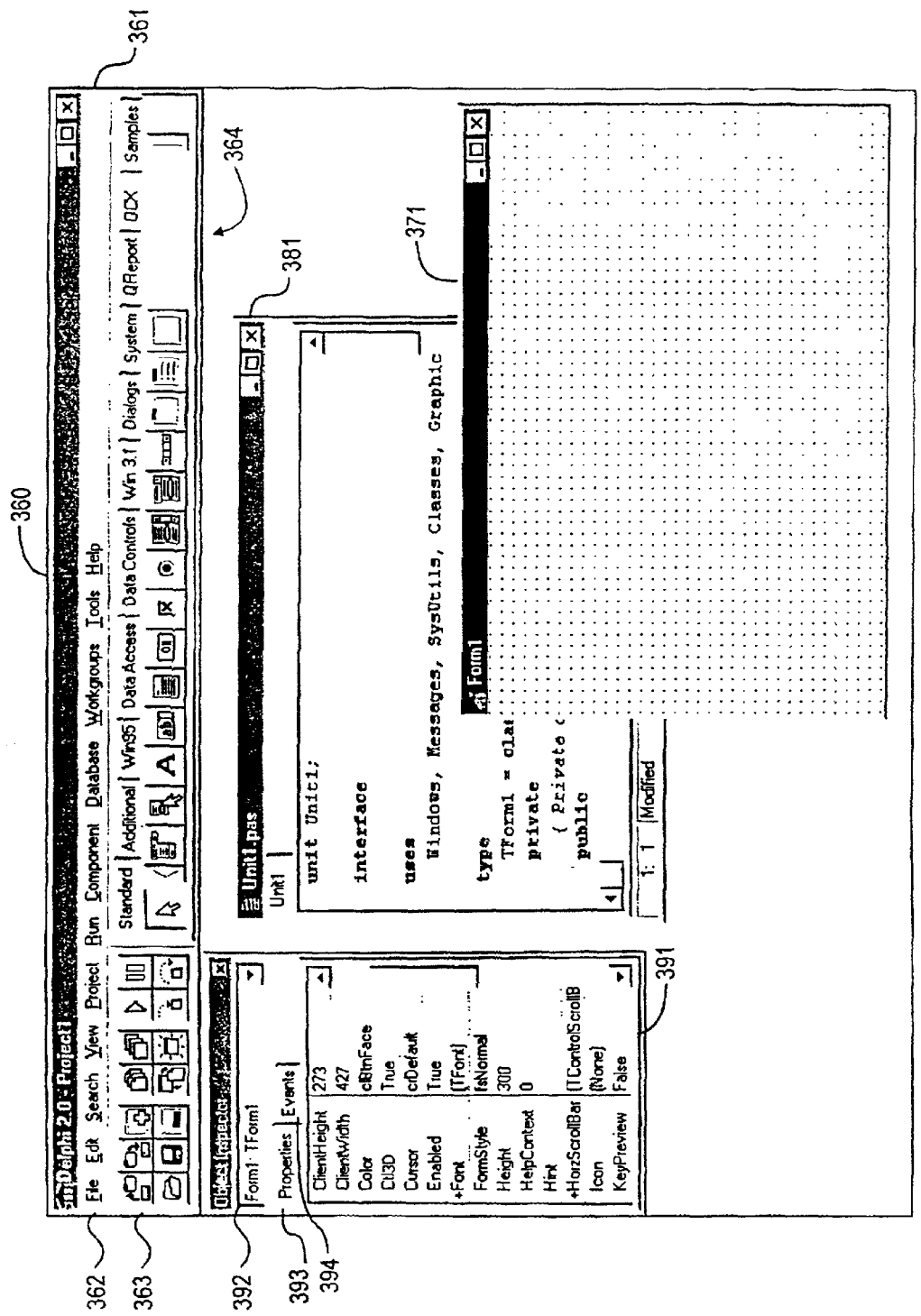
FIG. 3 is a bitmap screenshot illustrating a preferred interface of an application development environment in which the present invention is embodied.

The present invention is embodied in Delphi.™., a component-based, rapid application development (RAD) environment available from Borland International of Scotts Valley, Calif. FIG. 3 illustrates an application development environment 360, which is provided by Delphi. Many of the traditional requirements of programming, particularly for Windows applications, are handled for the programmer automatically by Delphi.

As shown, the programming environment 360 comprises a main window 361, a form 371, a code editor window 381, and an object manager or "inspector" window 391. The main window 361 itself comprises main menu 362, tool bar buttons 363, and component palette 364. Main menu 362 lists user-selectable commands, in a conventional manner. For instance, the main menu invokes File, Edit, View submenus, and the like. Each submenu lists particular choices which the user can select. Working in conjunction with the main menu, toolbar 363 provides the user with shortcuts to the most common commands from the main menu. The toolbar is configurable by the user for including icons for most of the menu commands.

Forms, such as form 371, are the focal point of nearly every application which one develops in the environment. In typical operation, the user employs the form like a canvas, placing and arranging "components" on it to design the parts of one's user interface. The components themselves are the basic building blocks of applications developed within the environment. Available components appear on the component palette 364, which is displayed as part of the main window 361. In accordance with the presently preferred embodiment, the component palette includes frame component containers (sometimes referred to as "frames") which associate a number of more basic components together into a construct that can be placed into a form, alone or together with other frames. As described below, frame exhibit inheritance and aid the developer in RAD.

The form can be thought of as a component that contains other components. One form serves as the main form for the application; its components interact with other forms and their components to create the interface for an application under development. In this manner, the main form serves as the main interface for an application, while other forms typically serve as dialog boxes, data entry screens, and the like.

During "design" mode operation of the system, the user can change the properties of the form, including resizing the form and moving it anywhere on screen. The form itself includes standard features such as a control menu, minimize and maximize buttons, title bar, and resizeable borders. The user can change these features, as well as other "properties" of the form, by using the object inspector window 391 to edit the form during design time. Likewise, the properties of a frame can be modified. Thus, properties define the appearance and behavior of component forms and frames.

Components are the elements which a user typically employs to build his or her applications. They include all of the visible parts of an application, such as dialog boxes and buttons, as well as those which are not visible while the application is running (e.g., system timers). In the programming environment 360, components are grouped functionally on different pages of the component palette 364. Each functional group is identified by a tab member, which includes a label indicating the particular nature of the group. For example, components that represent the Microsoft Windows common dialog boxes are grouped on the "Dialogs" page of the palette. The palette can incorporate user-created custom controls, which the user installs onto the palette. Additionally, the user can install third-party components.

Frames are also included on the component palette in accordance with an aspect of the invention. A frame, when selected, presents a workspace in which the developer can include components. Template frames can be provided that are pre-populated with components with pre-defined properties. The workspace appears as a window substantially the same as "Form1" 371, except the dotted-grid can be committed to visually distinguish a form from a frame. Any editing operation that can be performed on a form can be performed in like manner on a frame.

The object inspector window 391 enables the user to easily customize the way a component appears and behaves in the application under development. The inspector 391 comprises an object selector field 392, a properties page 393, and an events page 394. The object selector 392 shows the name and type of the currently selected object, such as "Form1," as shown. The properties page 391 lists the attributes of a component placed on a form (or the form itself) which can be customized. The events page, on the other hand, lists "event handlers" for a particular component. Event handlers are specialized procedures which may include user-provided program code.

Code editor 381 is a full-featured editor that provides access to all the code in a given application project. In addition to its basic editing functionality, the code editor 381 provides color syntax highlighting, for assisting the user with entering syntactically-correct code. When a project is first opened, the system automatically generates a page in the code editor for a default unit of source code; in the Object Pascal preferred embodiment, the default unit is named Unit1.

The following description will focus on those features of the development system 200 which are helpful for understanding methods of the present invention for implementing a frame component container in a visual development environment.

Visual Form Inheritance and the Use of Frame Component Containers

A. Introduction

What happens at design time should mimic exactly what happens at runtime. If one makes changes at design time to a form, those changes should automatically propagate to descendant forms, regardless of whether such descendant forms are each loaded. This should occur regardless of how many levels of inheritance are in place.

1. Delegation of all "Properties"

Most of the properties of a component are saved through type information. Certain "properties" of a component cannot be saved as type information, however. A bitmaps data, for instance, is not a property of a component. Accordingly, it is not appropriate to attempt to store this type of data through type information. In the system of the present invention, a new "define properties" method is introduced for handling those items which are not property-like (value oriented) in nature. Such data includes not only a bitmap's actual bitmap data but also a string list's actual list. This method causes the data for the "property" to be written out to the persistent image. In effect, this is a call into the object requesting that anything it cannot describe as a property be written out as data.

Such a "property" one which does not have a particular "type" —is problematic to propagate at design time. Communicating such free form information to descendants is problematic. A mechanism is needed to propagate that information when it changes but also to not propagate that information when it does not change.

2. Delegation of Event Handlers

Since the system of the present invention employs a delegation model which uses "method pointers" (described in the abovementioned commonly-owned, co-pending application Ser. No. 08/594,928), the system must ensure that when a method pointer is instantiated on the ancestor, when that method pointer is overridden at the descendant, that method acts as a virtual method. Here, the persistent binding of an object (e.g., button) to its method handler can be treated as a message dispatch or virtual method table. When the method pointer is changed in the ancestor (to point to a new method), the method pointer would invoke the most-recently derived method automatically. For instance, if a "Button1Click" method is introduced into the ancestor, a derived "Button1Click" method would also be introduced. The method need not be a virtual method of the class. Nevertheless, the persistent image makes it appear to be virtual (because the most derived would be called). Accordingly, the call can be treated as an "inherited" call.

Since a persistent stream exists, the system need only write out those properties that have changed (which are recorded in the type information). Here, the only information written out is that which is different from the default instantiation for the object. If the ancestor is viewed as a set of default values, then the descendant can be saved by only streaming out those values or properties which have changed. Since a descendant does not save out values which the descendant has not changed, any properties of the ancestor which undergo change are simply passed through to the descendant (since the descendant does not store its own value for these). At the descendant, one can override on a property-by-property basis values of the ancestor, but still get those values which have not been overridden. Accordingly, maintenance of the ancestor leads to automatic propagation of those values without having to recompile the descendants.

B. Visual Form Inheritance User Interface

Figure 4A:
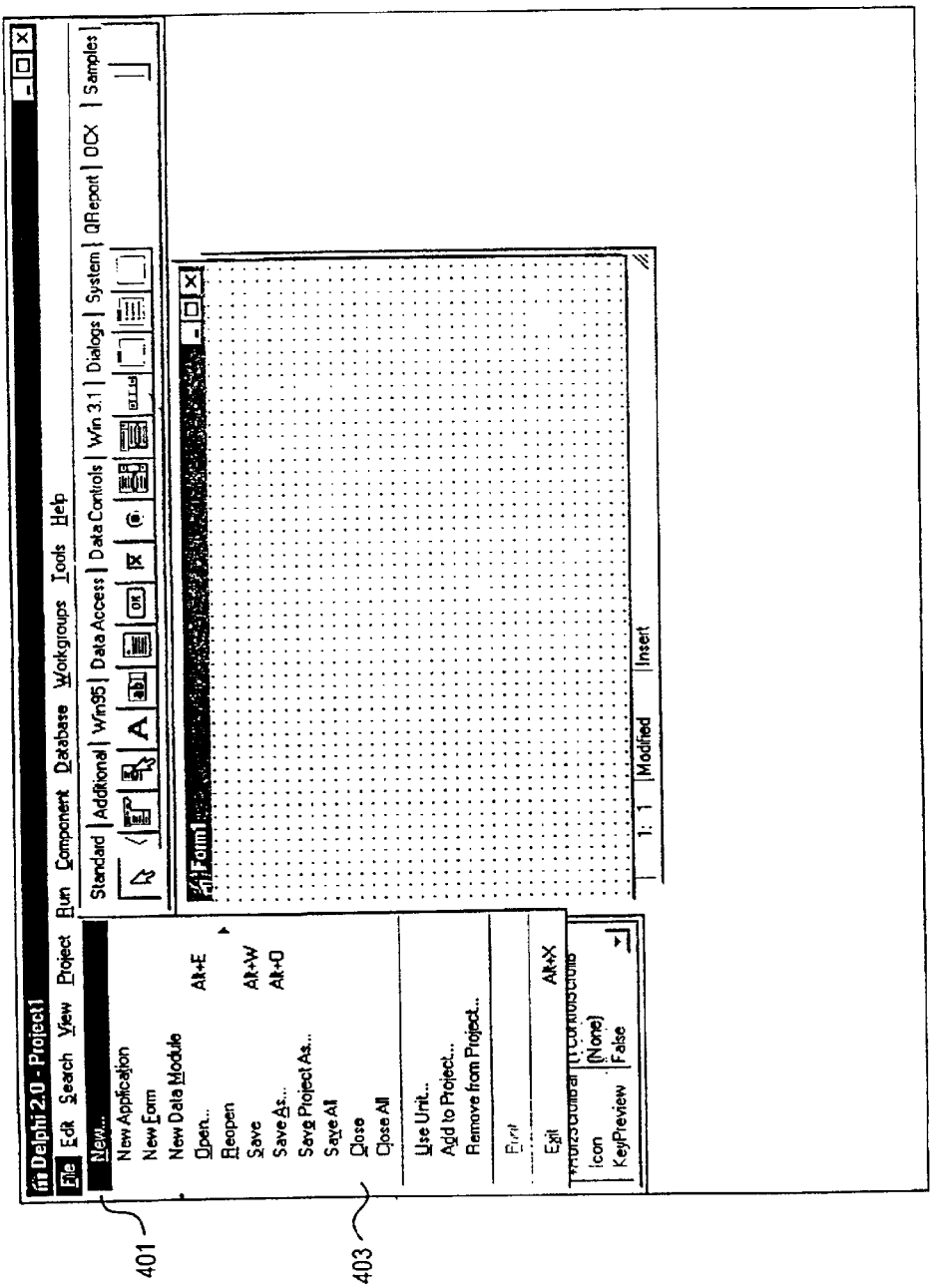
FIGS. 4A–D are bitmap screenshots illustrating operation of preferred user interface for using form inheritance methods of the present invention.
Figure 4B:
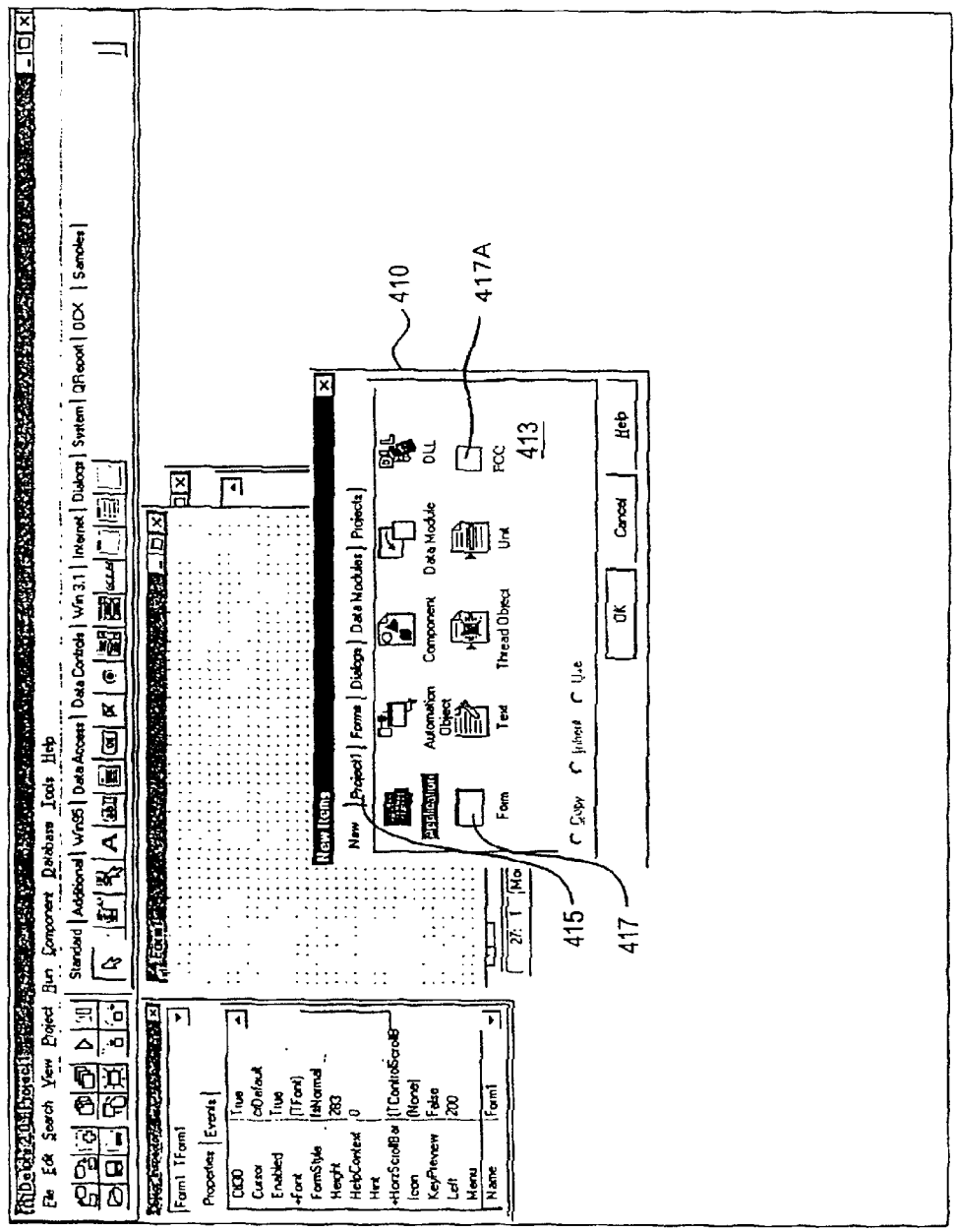

Use of the system for creating application programs using the form inheritance methodology of the present invention is perhaps best described by illustrating operation of the user interface. At the outset of starting a new project, a user creates a blank form. This is done as follows. In FIG. 4A, the user selects a "new" menu option 401 from pulldown menu 403. In response, the system displays a New Items dialog 410, as shown in FIG. 4B. The new items dialog 410 allows the user to select a form, or project template, as a starting point for a new application. In essence, the New Items dialog provides a view into an object repository (described below) which contains objects, including forms, frame component containers and projects. The user can use the objects directly, such as copying them into projects, or use them to inherit items from existing objects. Thus, the "new" page (shown at 413) includes items that the user can use in his or her project.

In an exemplary embodiment, default items provided by the "new" page 413 include the following.

| | |
|---|---|
| Application | Creates a new project containing a form, a unit, and a .DPR, or provides a way for the user to select a template. |
| Automation Object | Creates a .pas file which contains an Automation Object template. |
| Component | Creates a new component using the Component Expert. |
| Data Module | Creates a new Data Module. |
| DLL | Creates a new DLL project. |
| Form | Creates and adds a blank form to the current project, or enables the user to select a form template. |
| Frame Component Container | Creates and adds a blank frame to the current project or enables the user to select a frame template. |
| Text | Creates a new ASCII text file. |
| Thread Object | Creates a new Thread Object. |
| Unit | Creates and adds a new unit to the current project. |

Figure 4C:
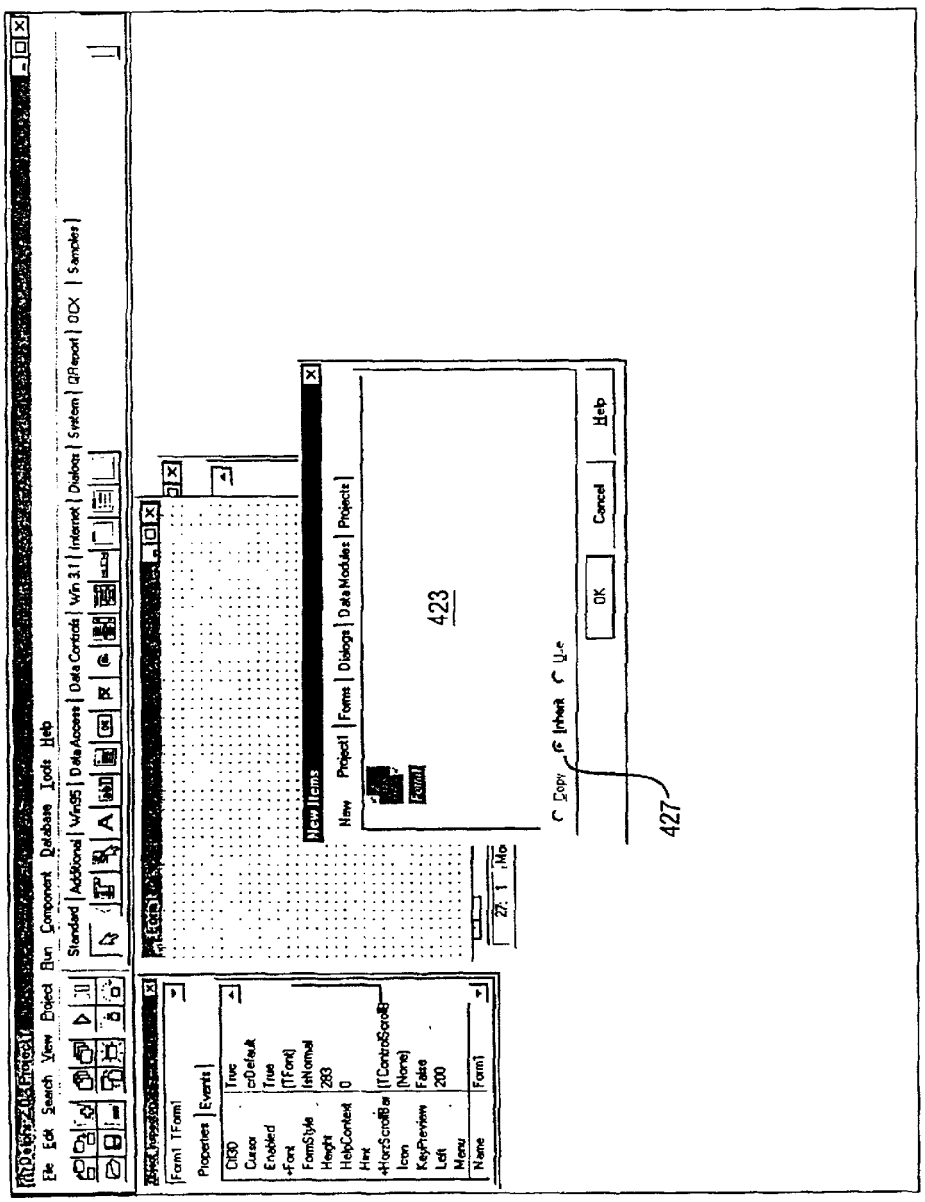
Figure 4D:
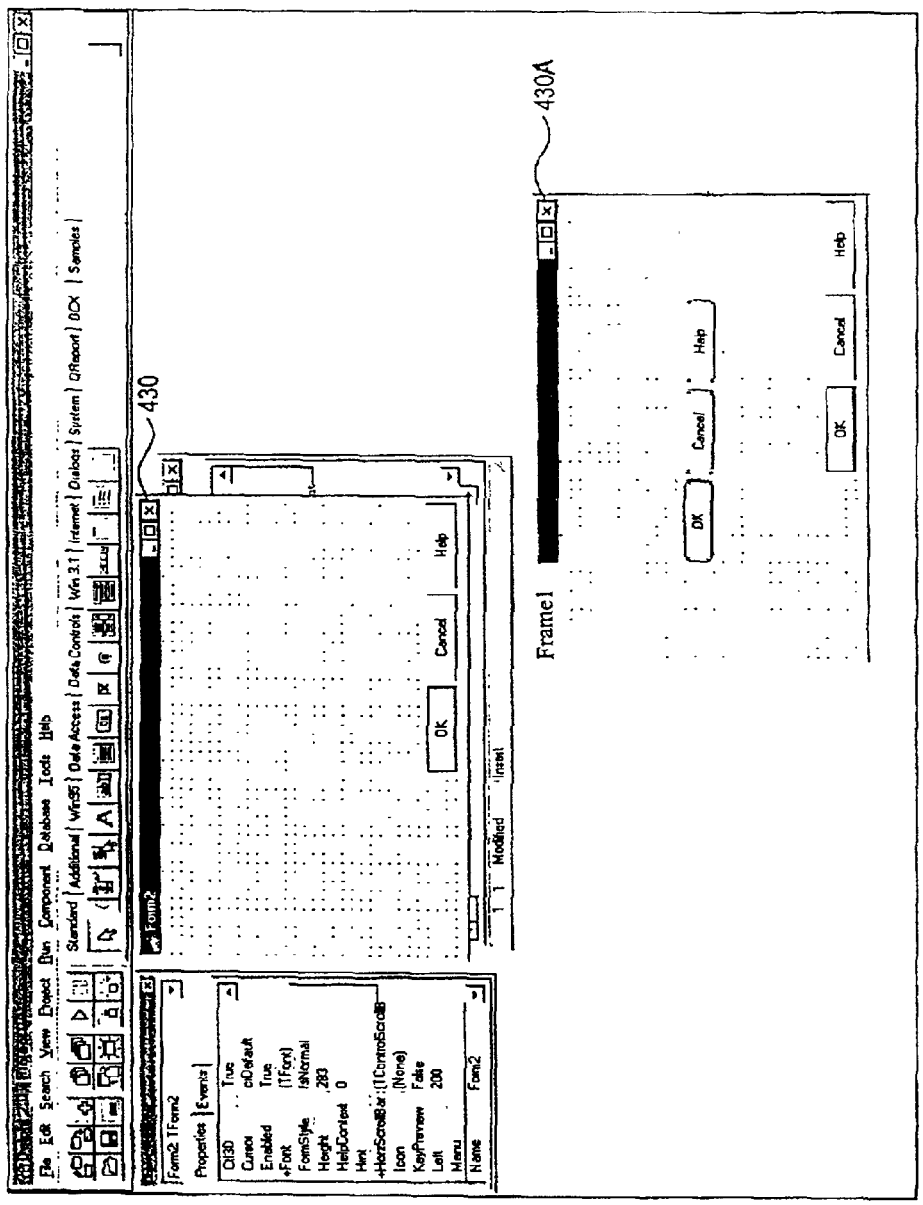

Upon the user selecting "Project1" tab 415 from the New Items dialog 410, the system displays Project page 423, as shown in FIG. 4C. If a project is open, the Project page 423 represents the currently active project. Further, the tab 415 displays the title for the project. The current project page contains all the forms and frames of the project. From here, the user can create an inherited form or frame from any existing project form. To add a new form or frame to the current project, on the other hand, the user selects (i.e., "clicks") a "Form" icon 417 or a "frame component container" icon 417A, from "New" page 413 shown in FIG. 4B. As a result of this user operation, the system now displays a new form, Form2, as shown at 430 in FIG. 4D or the system displays a new frame, frames, as shown at 430A in FIG. 4D.

In the system of the present invention, the user can derive forms and frames from other "ancestor" forms and frames, inheriting their components, properties, and code as a starting point for one's own forms and frames. The use of frame component containers provide the developer with a degree of modularity not available when using forms. In particular, multiple frames can be designed or selected from an Object Repository and included in a common form whereas conventional operating systems such as Windows and Linvx do not permit pre-defined or blank forms to be placed in to another form.

The operation of a frame component container otherwise mirrors that of forms and so the following containers as well, including the principles of inheritance, templates and the use of object repository.

As shown in FIG. 4C, the user can select "Inherit" choice 427 for indicating to the system that the form to be created inherits from an existing ancestor form. Ancestor forms can be any forms already contained in an existing project or in the object repository. Form inheritance allows the user to create a library of standard form templates, either within a single application or across an entire suite of applications. Any changes made to the ancestor form immediately appear in the descendant forms. Further, the use can customize each form type so derived while still retaining the ability to modify the standard form and have those changes reflected in the derived forms. As noted above, creation and operation of frames generally track that of forms.

The "object repository" serves as a means for sharing and reusing forms, frames and projects. In an exemplary embodiment, the repository itself is implemented as a text file containing references to forms, frames, projects, and other objects. By adding forms, dialog boxes, and data modules to the object repository, the user makes these objects available to other projects. For example, the user can have all of his or her projects use the same about box by placing a reference to a particular about box in the object repository. When the user creates a new form, the user has the option of either starting with a blank form or starting from an already-designed form type. When the user starts from an already-designed type, he or she can either copy that form, inherit from it, or use it. When a form inherits from another form, the system creates a reference to the ancestor form and only generates additional code for adding components and event handlers. If several forms in a project are inherited from the same ancestor, they share the inherited code. Each of these forms can include the same frames, different frames, or no frames at all.

Figure 5A:
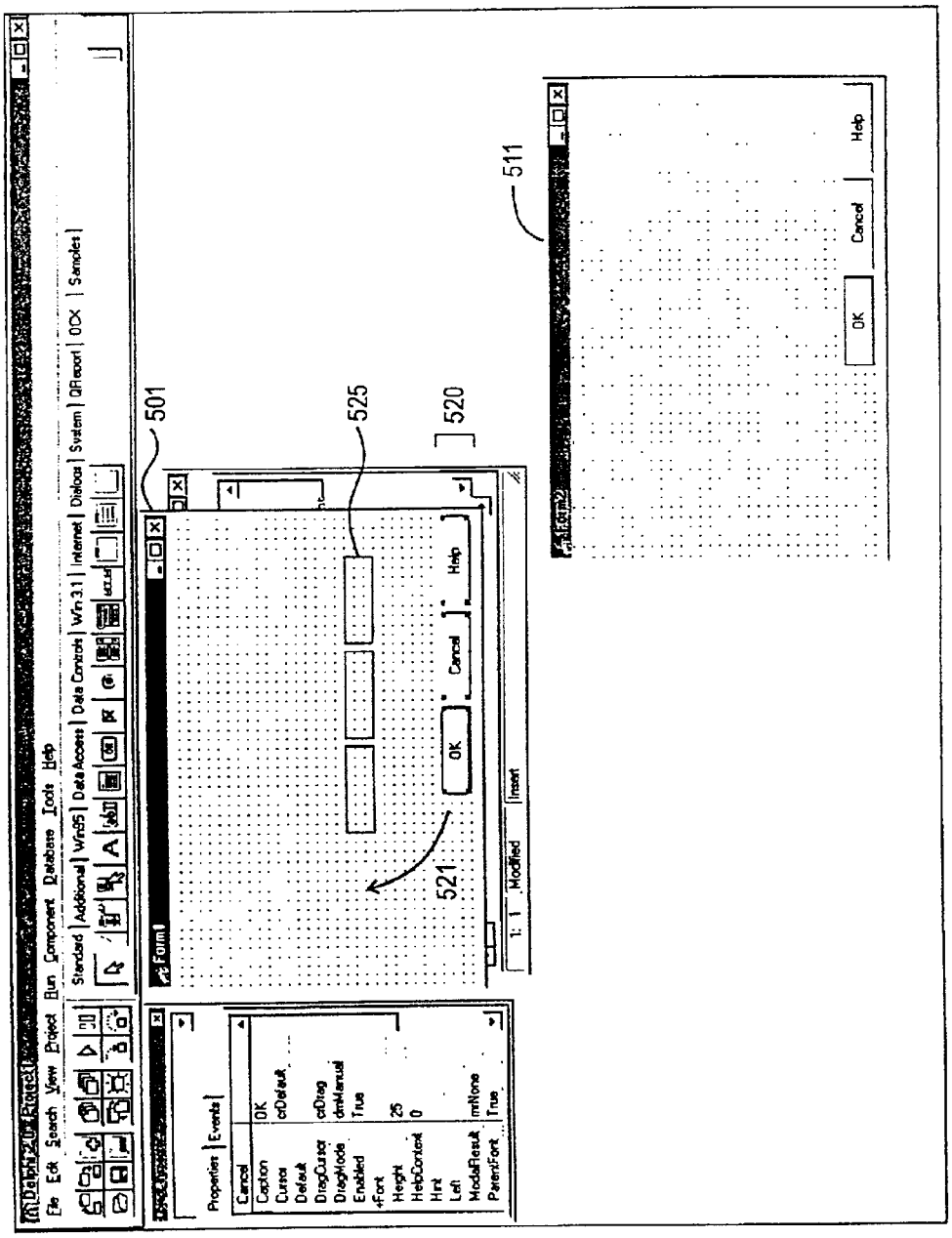
FIGS. 5A–C are bitmap screenshots illustrating propagation of changes (to properties) from an ancestor form to a corresponding descendant form.

FIG. 5A illustrates an ancestor form, Form1 (501), together with a descendant form, Form2 (511). Note that since Form inherits from Form it contains essentially identical properties and event handlers as those of Form1, except that Form2 includes a different name (as each object in the system is uniquely identified within a particular scope of objects). In FIG. 5A, Form has been moved by the user to a new location (i.e., change its position (e.g., top and left) properties), so that it can be viewed simultaneously with Form1. Also illustrated in the figure is the selection by the user of screen buttons 520 of Form1 and "dragging" these buttons, as indicated by direction arrow 521, to a new location 525.

Figure 5B:
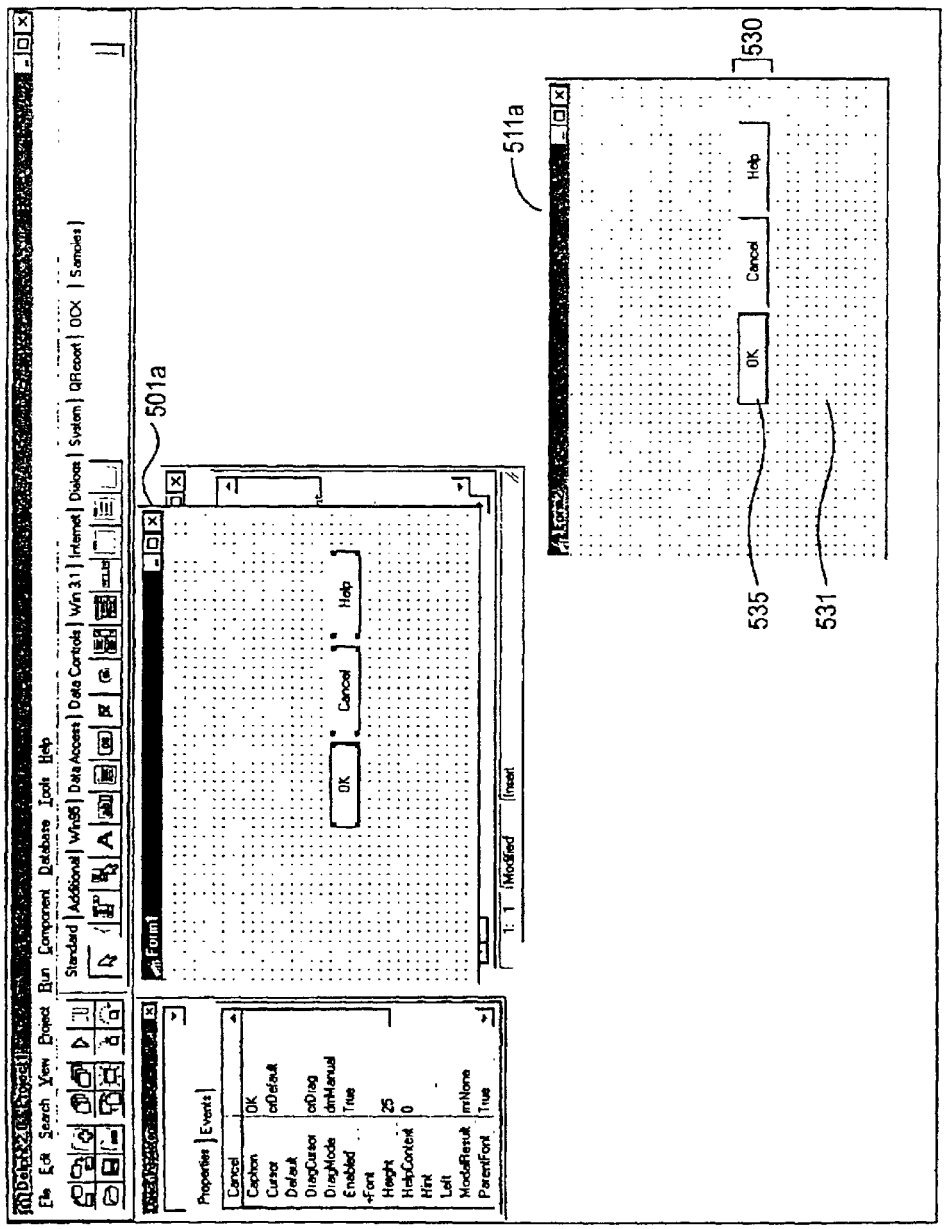
Figure 5C:
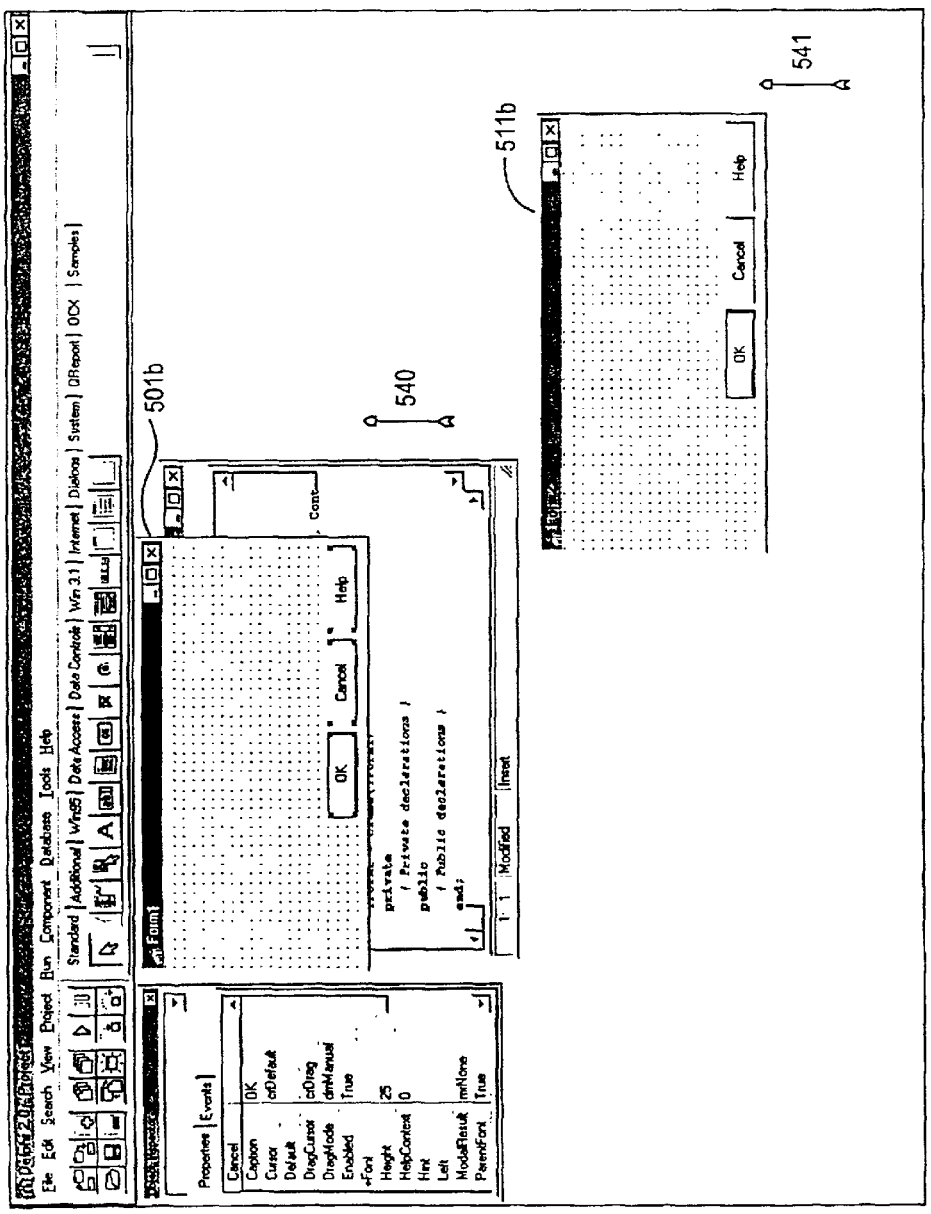

FIG. 5B illustrates completion of the drag operation—that is, at the point when the user drops the screen buttons 520 at the new location 525. Since Form2 (shown at 511a) is a descendant of Form1 (shown at 501a), the above-described movement of screen buttons or controls 520 on Form1 is, in turn, propagated to respective objects on Form2, screen buttons 530. Specifically, without further user intervention, screen buttons 530 automatically move from position 531 to new position 535, thereby completing propagation of changes from the ancestor to the descendant. Similarly, resizing ancestor Form (shown at 501b) to a new size, as indicated at 540 in FIG. 5C, immediately propagates a new size to descendant Form (shown at 511b), as indicated at 541. In this manner, the user can change other properties of ancestor Form and have those property changes propagate to all descendant forms without further intervention on the part of the user.

Figure 6A:
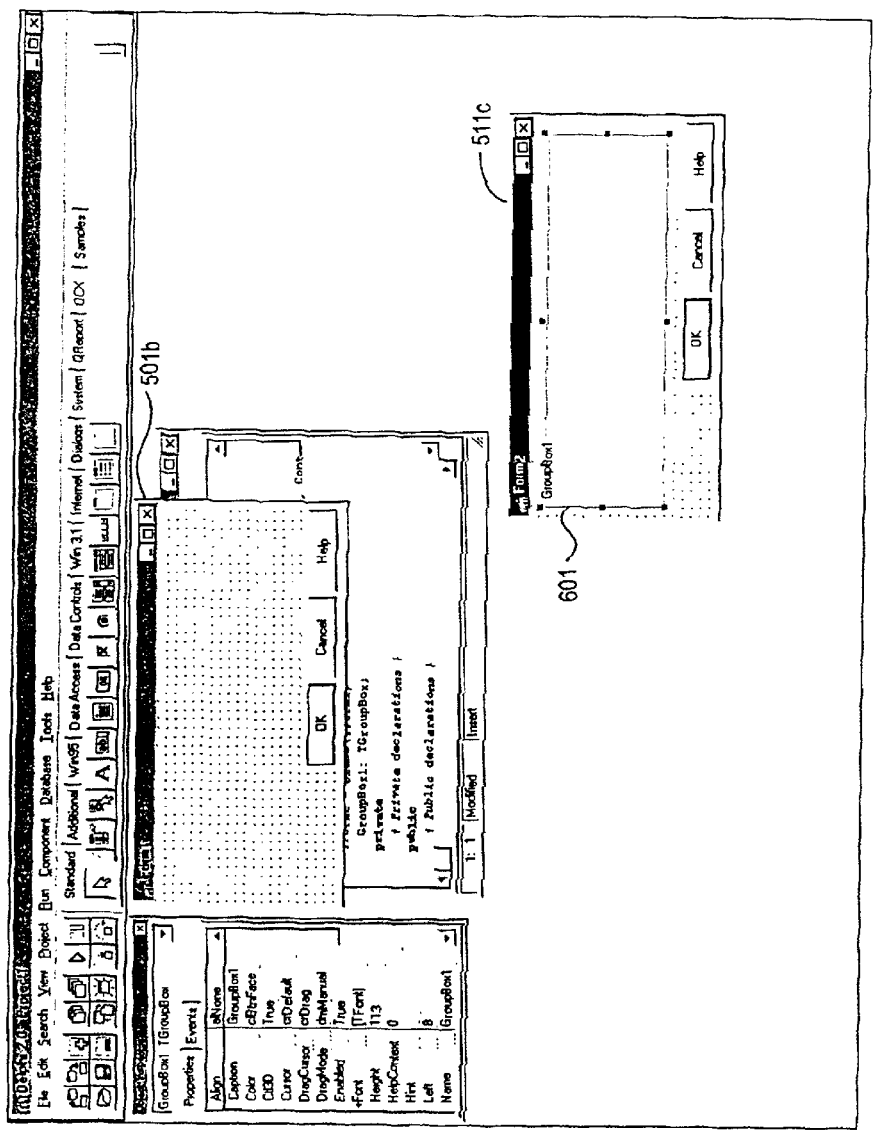
FIGS. 6A–E are bitmap screenshots illustrating a preferred interface whereby a user can customize an inherited component on a descendant form, without affecting the ancestor forms corresponding component.
Figure 6B:
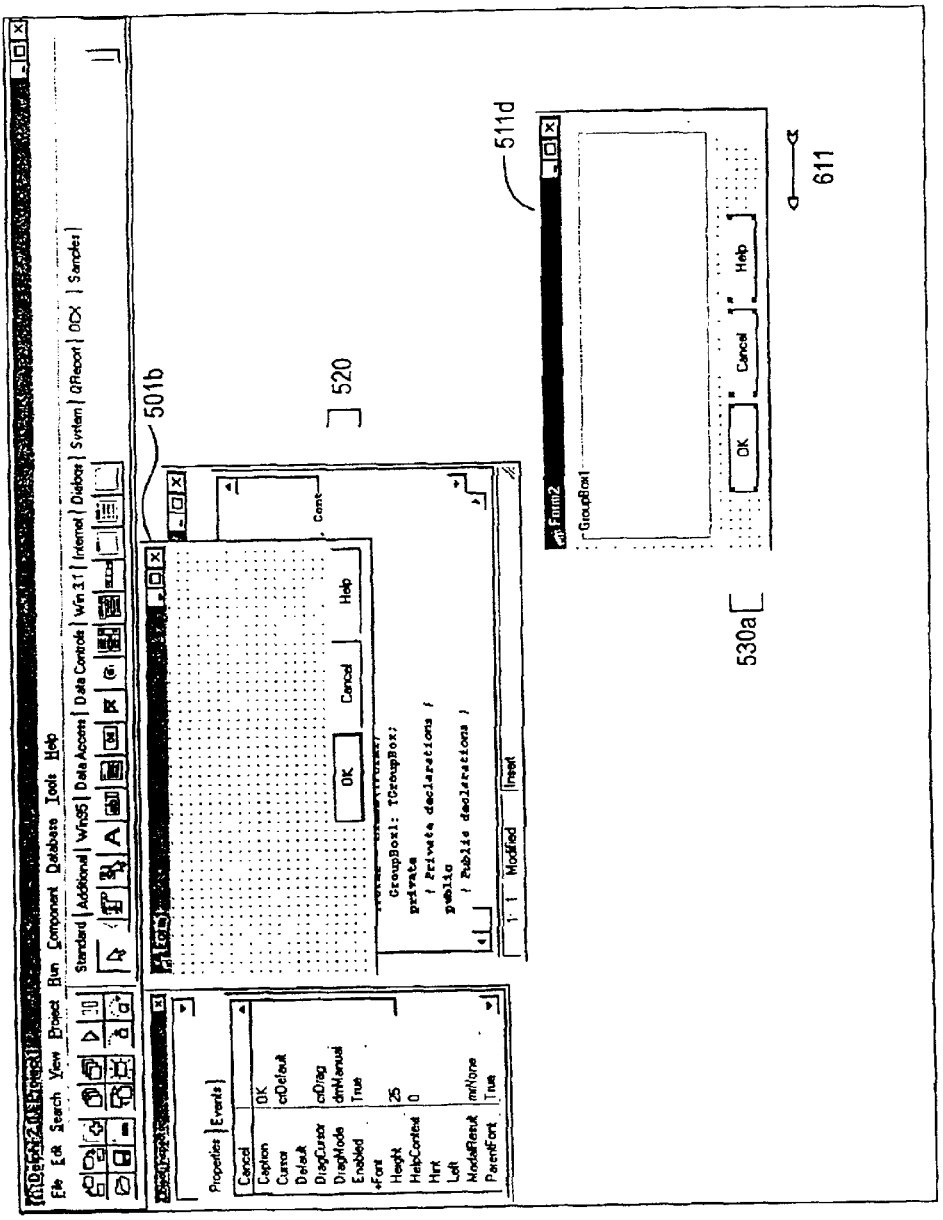

Typically, at some point the user will want to further customize descendant forms and frames. In FIG. 6A, for instance, the user has added a group box component 601 to the descendant Form2 (shown at 511c). Now the descendant is modified, with no effect on the ancestor (shown unchanged at 501b). Still further, the user can customize inherited components on the descendant form, without effect on the ancestor form's corresponding components. As shown particularly in FIG. 6B, buttons 530 (now 530a) are moved to a new location on Form (now shown as form 511d), as indicated by movement arrow 611. At the same time, however, corresponding screen buttons 520 on the ancestor Form (shown unchanged at 501b) are unaffected. In this instance, the user has "overridden" the property values inherited from the ancestor by the descendant form. When particular properties have been overridden with new values, further changes to those property values at the ancestor will not propagate to the descendant. If, for instance, screen buttons 520 are moved to a new location on Form1, such a movement will not effect the position of descendant screen buttons 530a, as propagation of the ancestor's property values is blocked by the overriding which occurred at the descendant. More particularly in this example, since movement of the buttons in the descendant was limited to horizontal movement, the "top" (vertical) position property of the descendants is still inherited from corresponding objects of the ancestor.

Figure 6C:
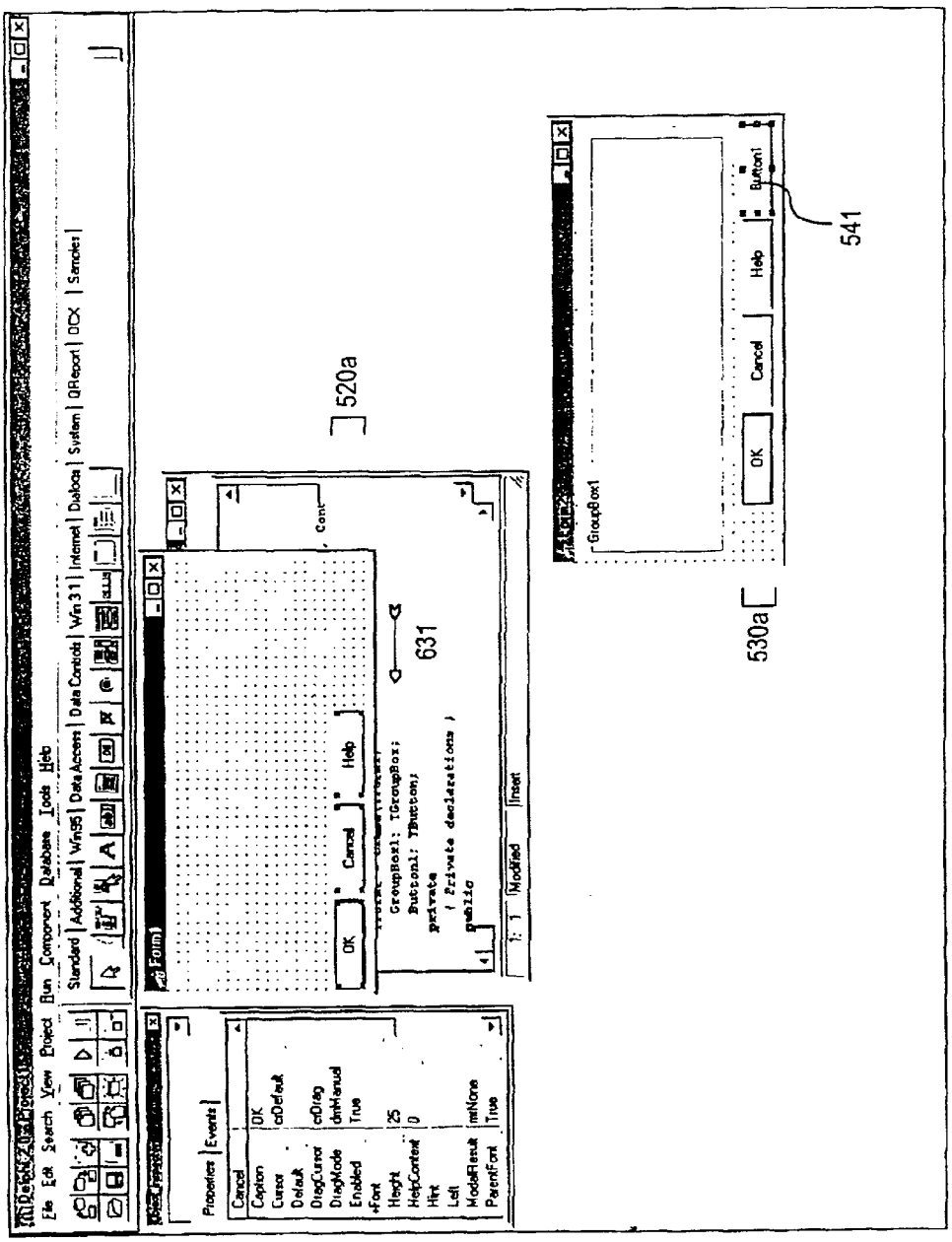
Figure 6D:
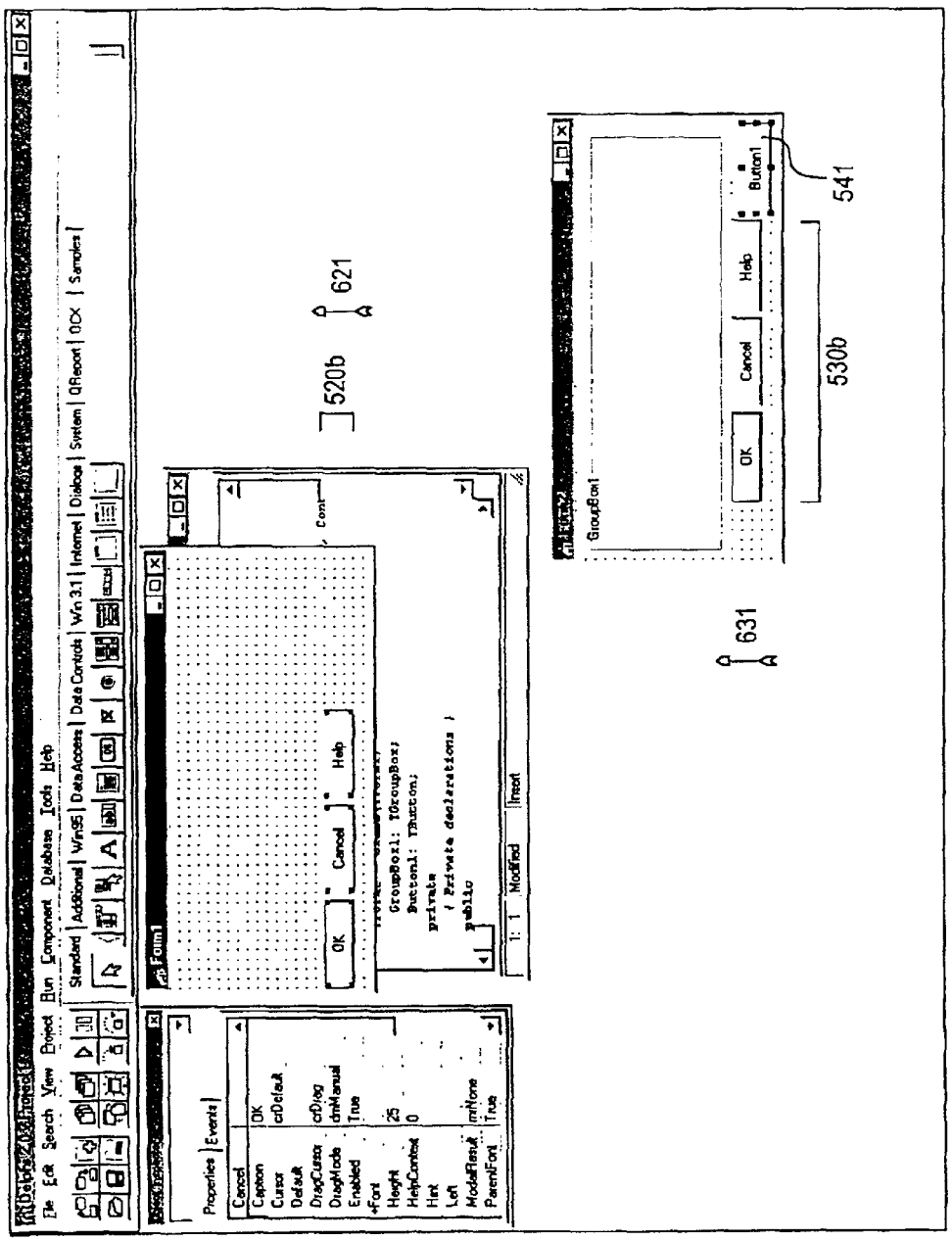

FIG. 6C illustrates movement (as indicated by arrow 631) of ancestor screen buttons 520 (now 520a) to a new horizontal location (i.e., change "left" property). Note, however, that such a movement does not effect the horizontal position of the descendant screen buttons (530a). As also shown in FIG. 6C, the user has placed a new screen button, Button1 (541), on the descendant Form2, with no effect on the ancestor Form1. As illustrated in FIG. 6D, vertical movement of screen buttons 520 (shown as 520b) a certain distance upward (indicated by arrow 621) propagates new "top" property values to corresponding screen buttons 530 (shown at 530b), by a corresponding amount (movement arrow 631). Button1 (541) is unaffected, however.

Figure 6E:
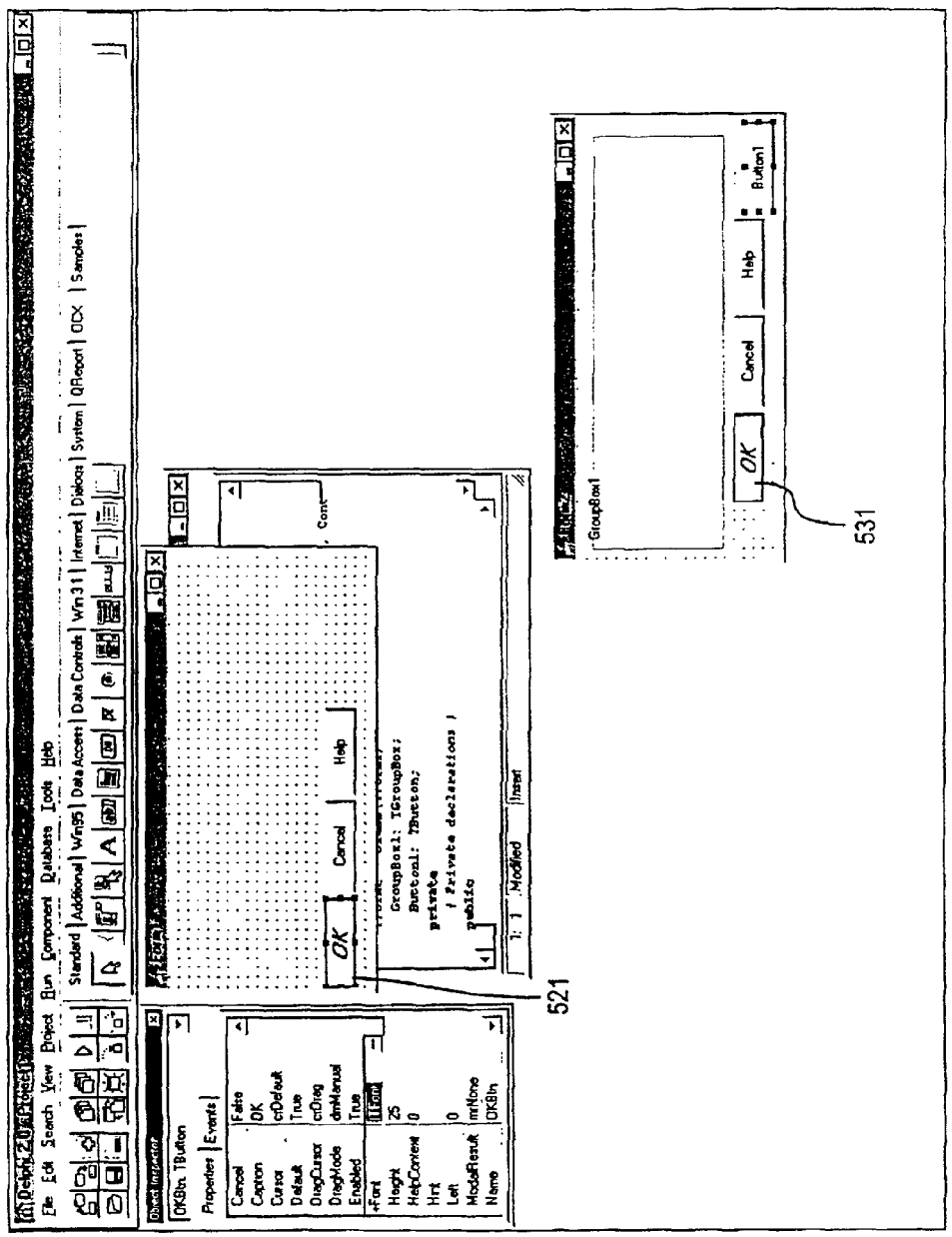

Finally, FIG. 6E illustrates that change of the font property of screen button 521 of Form1 propagates that property value change to corresponding descendant screen button 531, as that property value has not been overridden by the user. All told, property values of an ancestor propagate to descendants, so long as those corresponding property values of the descendant objects have not been overridden (i.e., customized by the user, and this is true for frame component containers as well as forms).

Figure 7A:
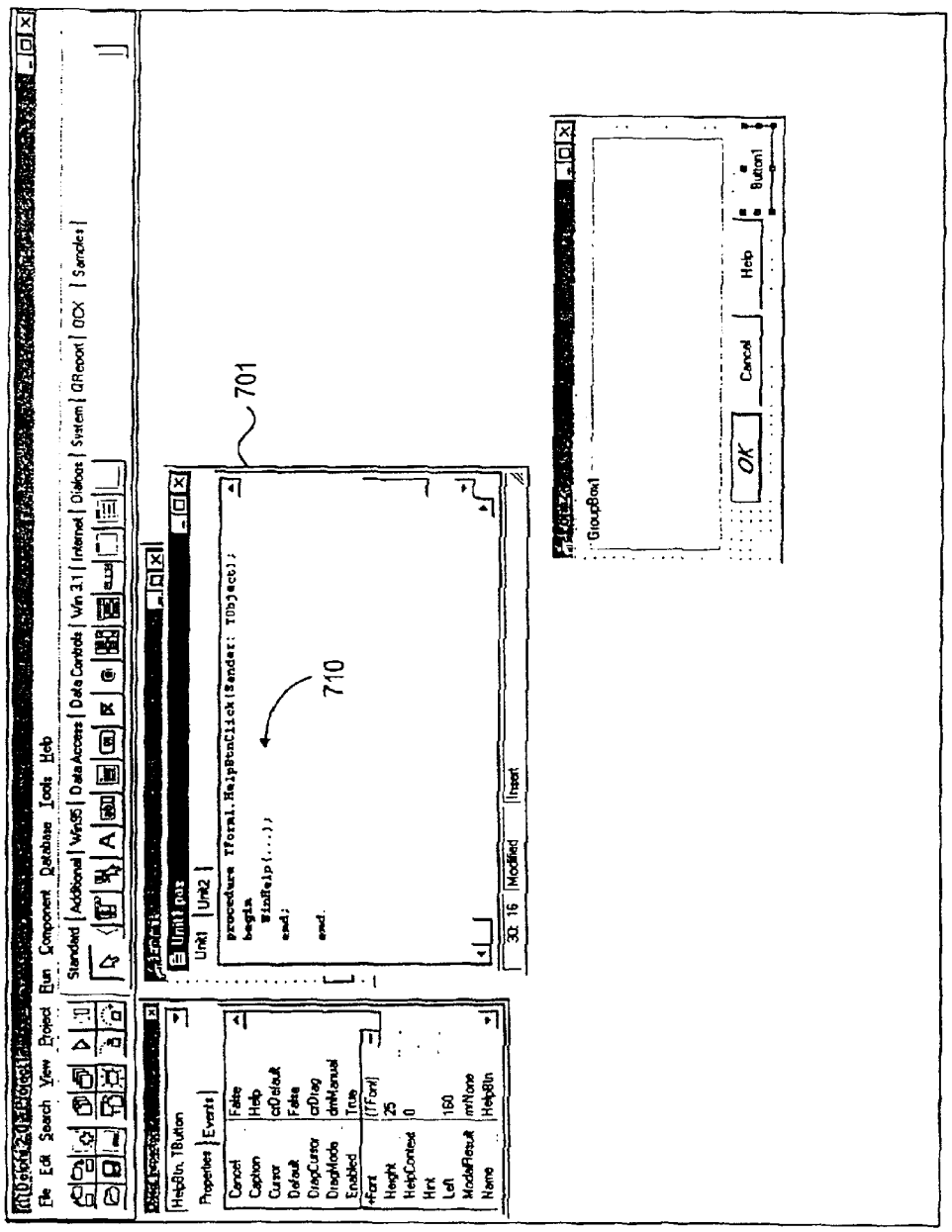
FIGS. 7A–F are bitmap screenshots illustrating a preferred user interface which is employed for "inheriting" at a descendant form a corresponding event handler of an ancestor form.

For purposes of form inheritance as well as frame component container inheritance, this propagation also applies to event handlers (i.e., propagation of an event handler from ancestor to descendant) in an automatic fashion, since event handlers (through the method pointer mechanism) can also be treated as properties. Inheritance of event handlers (code) is perhaps best illustrated by way of example. FIG. 7A illustrates event handling code 710 (in code editor 701) for the "help" button (from screen buttons 520) of form 1. As shown at 710, the event handler includes code for launching "WinHelp" (i.e., the standard help system provided by Microsoft Windows). As shown by the following class definition and instance declaration for Form1, Form (class) includes an event handler, HelpBtnClick.

```
TForm1 = class (TForm)
OKBtn: TButton;
CancelBtn: TButton;
HelpBtn: TButton;
procedure HelpBtnClick (sender: TObject) ;
private
{ Private declarations }
public
{ Public declarations }
end;
var
Form1: TForm1; { declare instance of class TForm1 }
```

Figure 7B:
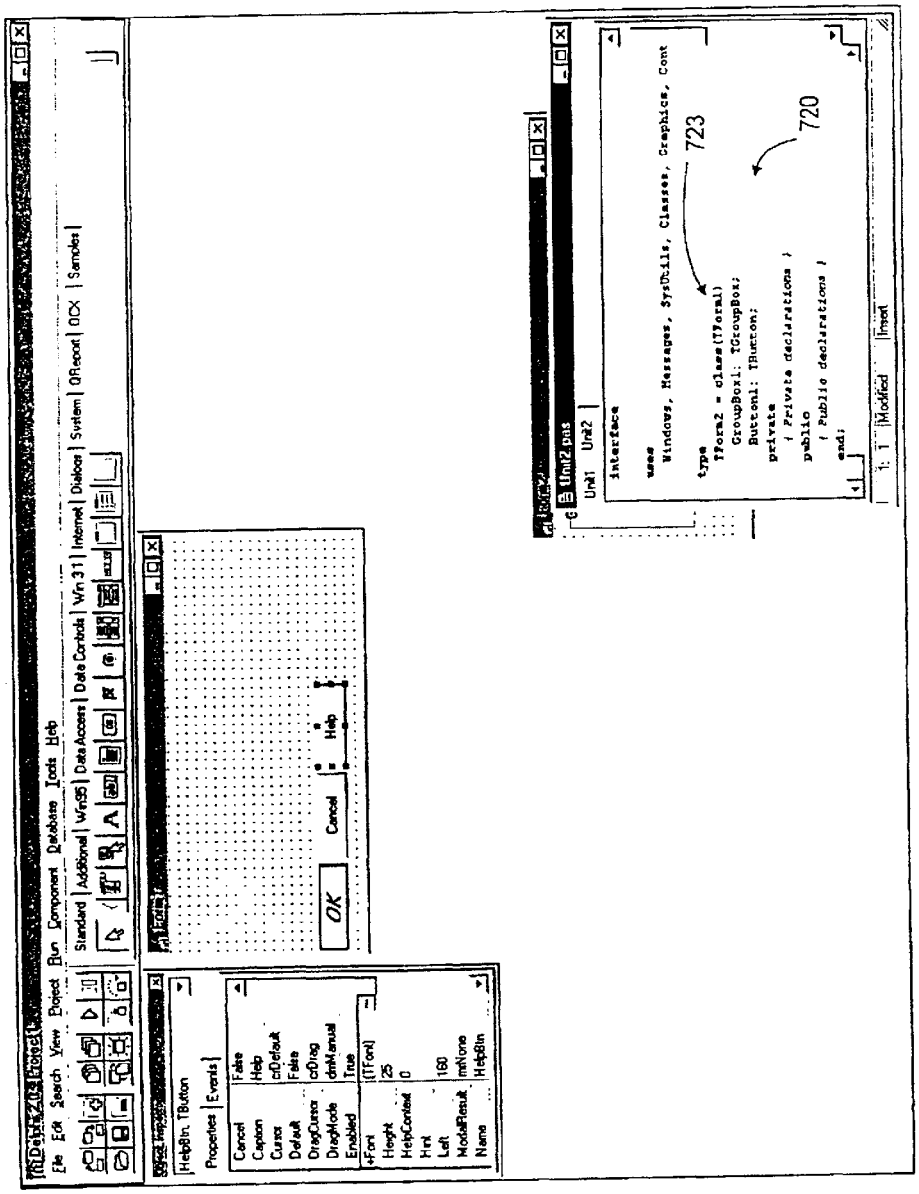

Note that the class definition for Form2, shown at 720 in FIG. 7B, does not include an event handler declared for the help button. Since the Form class inherits from the Form class (as indicated at 723 in FIG. 7B), the Form class definition need not include a declaration for the event handler. In other words, the functionality is instead inherited from the ancestor class (Form class) which, in turn, implements the event handler.

Figure 7C:
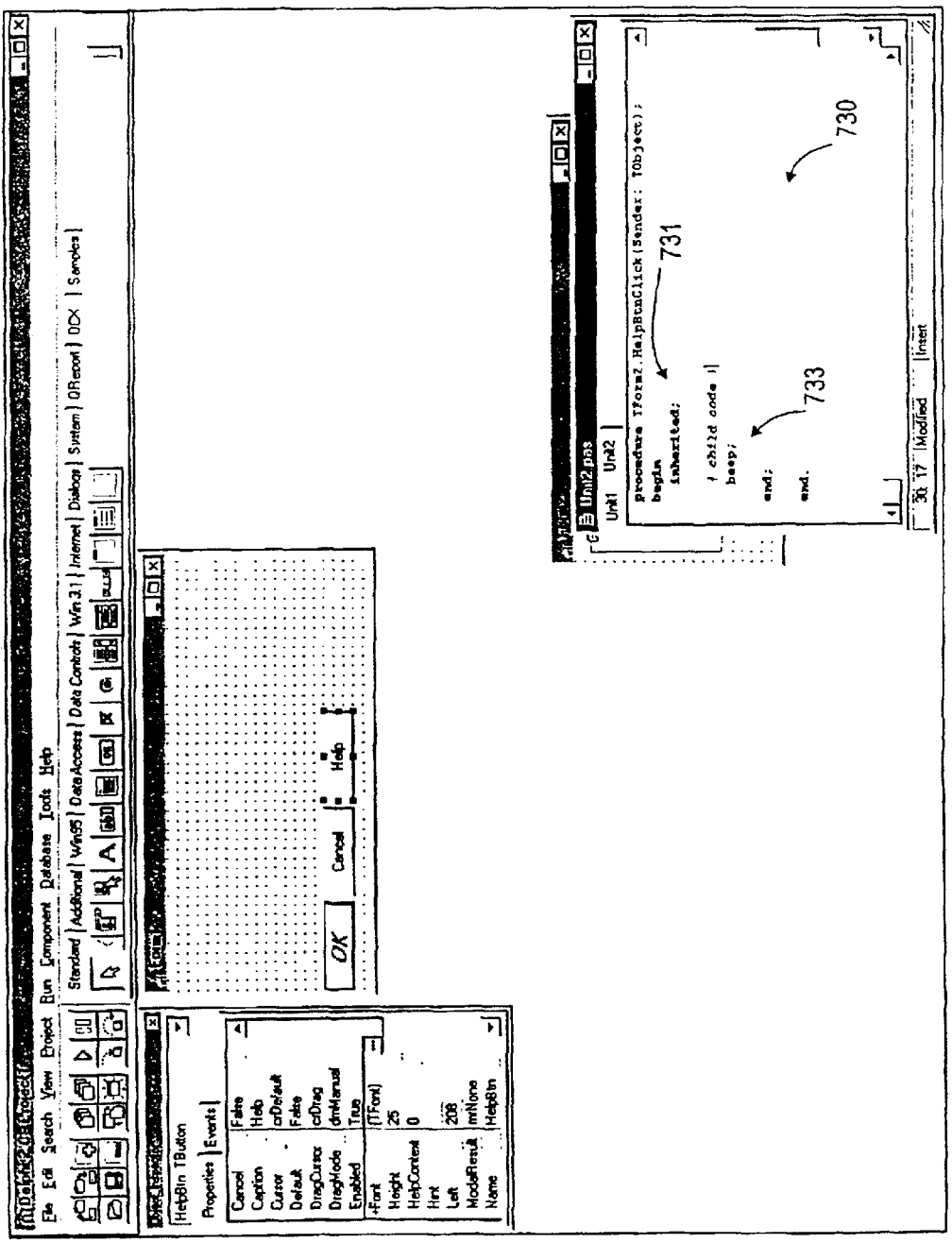
Figure 7D:
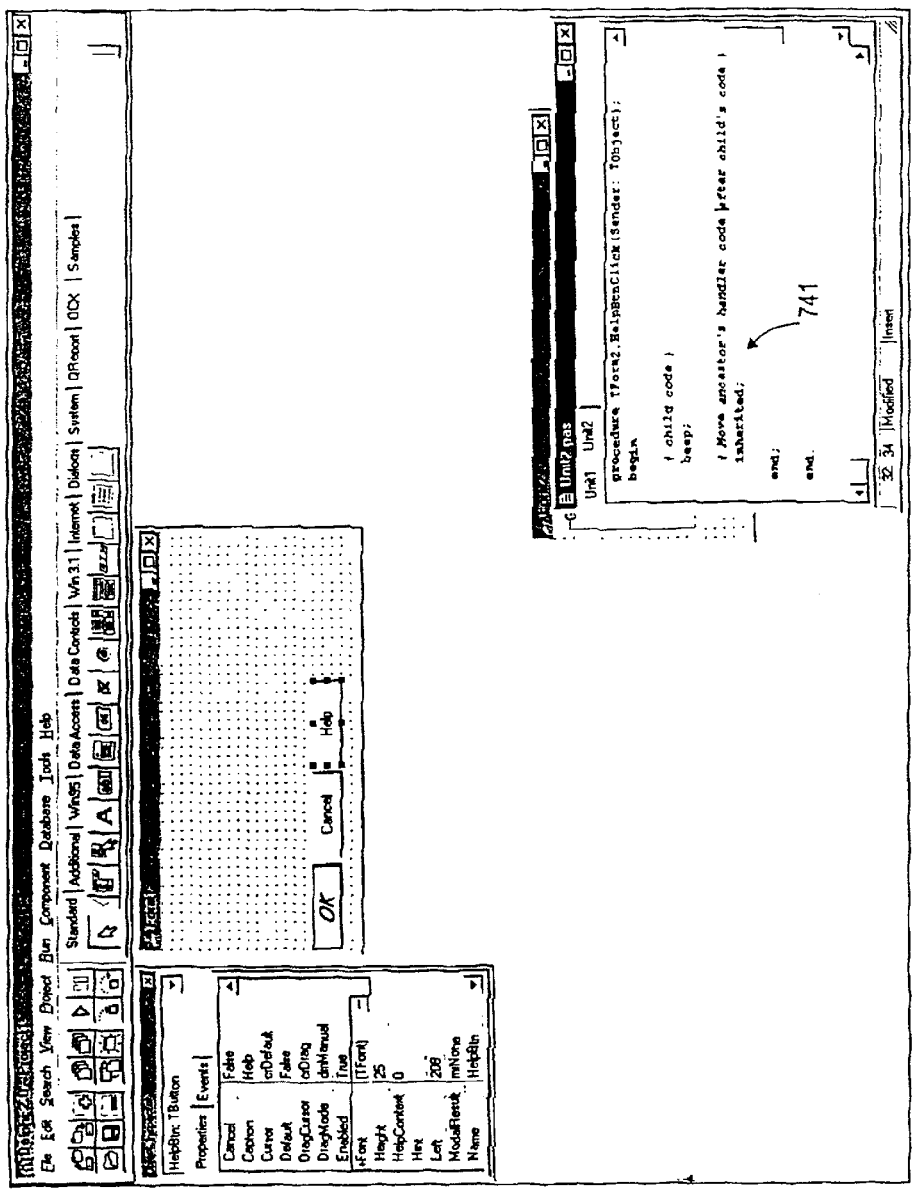
Figure 7E:
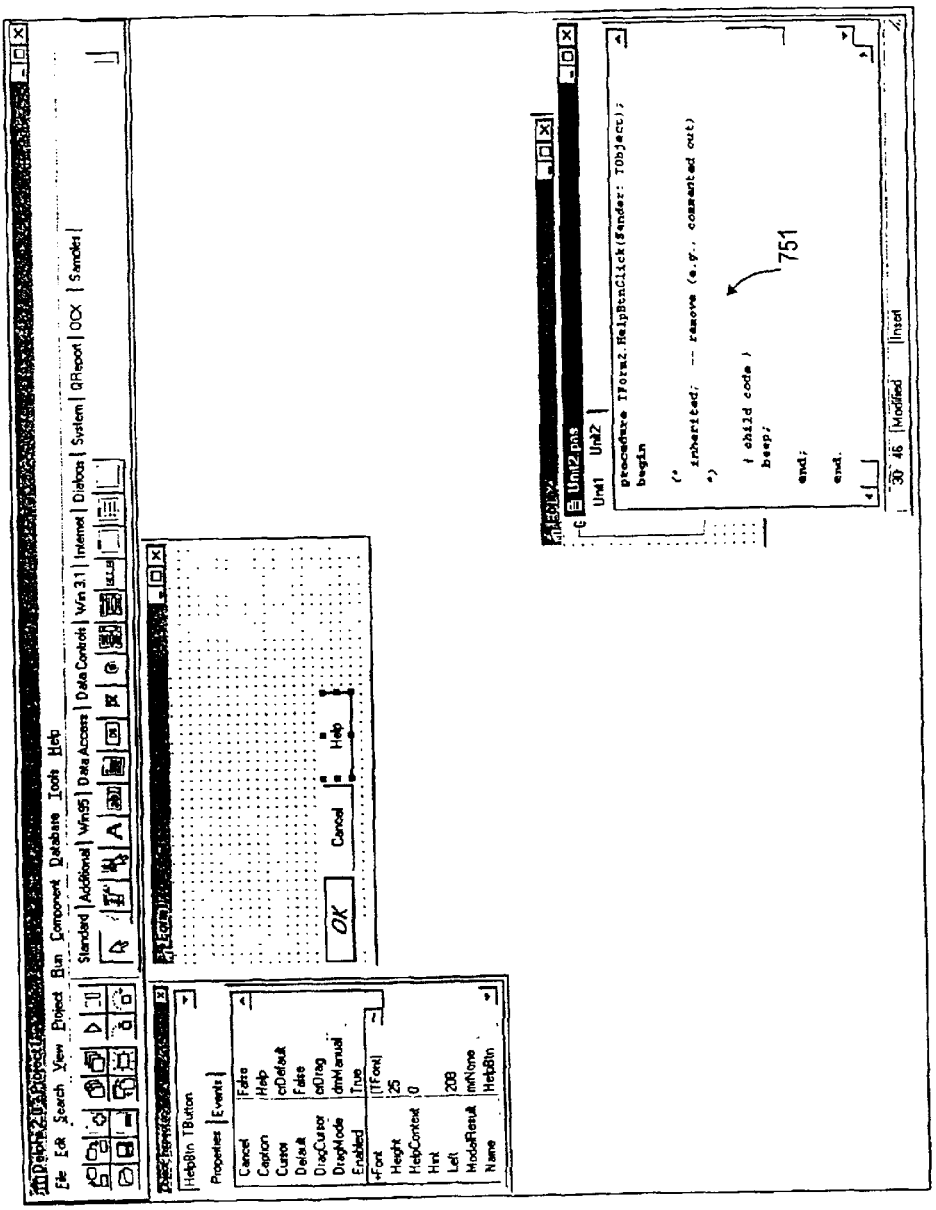

In a manner analogous to that shown for overriding property values, one can override event handlers of descendants. This is illustrated in FIG. 7C. By double clicking on the "help" button of Form (from screen buttons 530), the user invokes a new event handler for the descendant help button, as illustrated at 730. The system introduces the keyword "inherited" (731) into the event handler for indicating that it is to also perform the method steps implemented by the ancestor's corresponding event handler. In the example shown in FIG. 7C, the event handler 730 would first launch WinHelp, as a result of execution of the inherited handler, and then would proceed to execute any method steps added to the descendant event handler, such as the "beep" command shown at 733. As shown in FIG. 7D at 741, the ancestor's handler code can be moved to position it after the descendant's code, so that the ancestor's method steps execute after the method steps of the descendant or child. Finally, as illustrated in FIG. 7E at 751, the ancestor's handler code can be removed entirely (e.g., by either deleting or "commenting" it out). In such a case, only method steps for the descendant event handler execute. Here, the "inherited" reserved word instructs the system to call the event handler in the ancestor which has the same name.

Figure 7F:
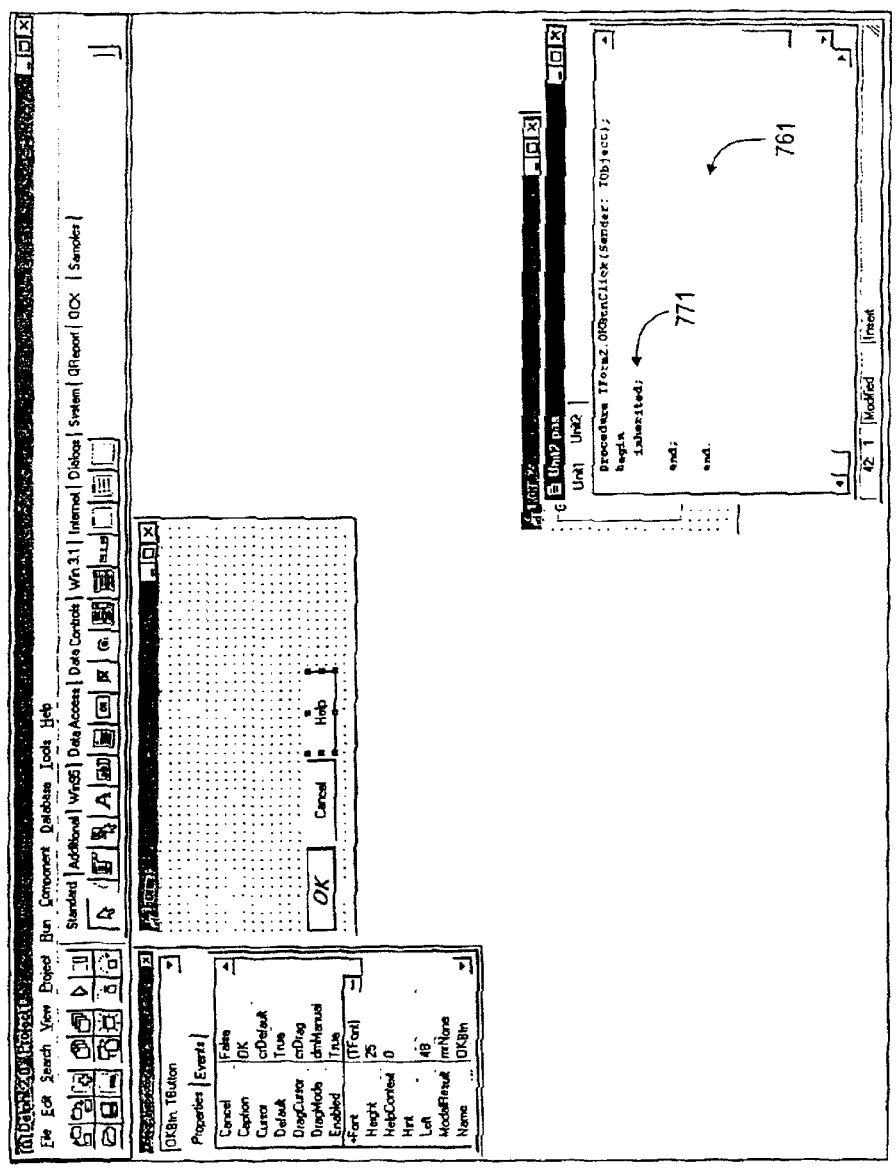

FIG. 7F illustrates an event handler 761 for the "OK" button of Form2. In this instance, an ancestor event handler has not yet been defined (i.e., Form does not include an event handler for its OK button). Nevertheless, the event handler 761 includes the "inherited" reserve word, shown at 771. This allows the descendant to automatically pickup any changes to corresponding event handlers of the ancestor, without having to recode the descendant.

The foregoing forms were simplified so that the general operation of form inheritance of the present invention could be demonstrated without distraction from forms having numerous elements. In typical practice, however, users will tend to use form inheritance for creating and managing complicated forms. It is for this particular use that form inheritance greatly simplifies the task of application development. It should be understood that the use of a frame component can further ease the application development process. A frame, like a form, is a container for other components. It uses the same ownership mechanism as forms for automatic instantiation and destruction of the components on it, and the same parent-child relationships (and inheritance as described above) for synchronization of component properties. A frame component container is more like a customized component than a form in that frames can be saved on the component palette for easy reuse and can be nested within forms, other frames, or other container objects. After a frame is created and saved, it continues to function as a unit and to inherit changes from the components (including other frames) it contains. When a frame is embedded in another frame or form, it continues to inherit changes made to the frame from which it derives.

Figure 8A:
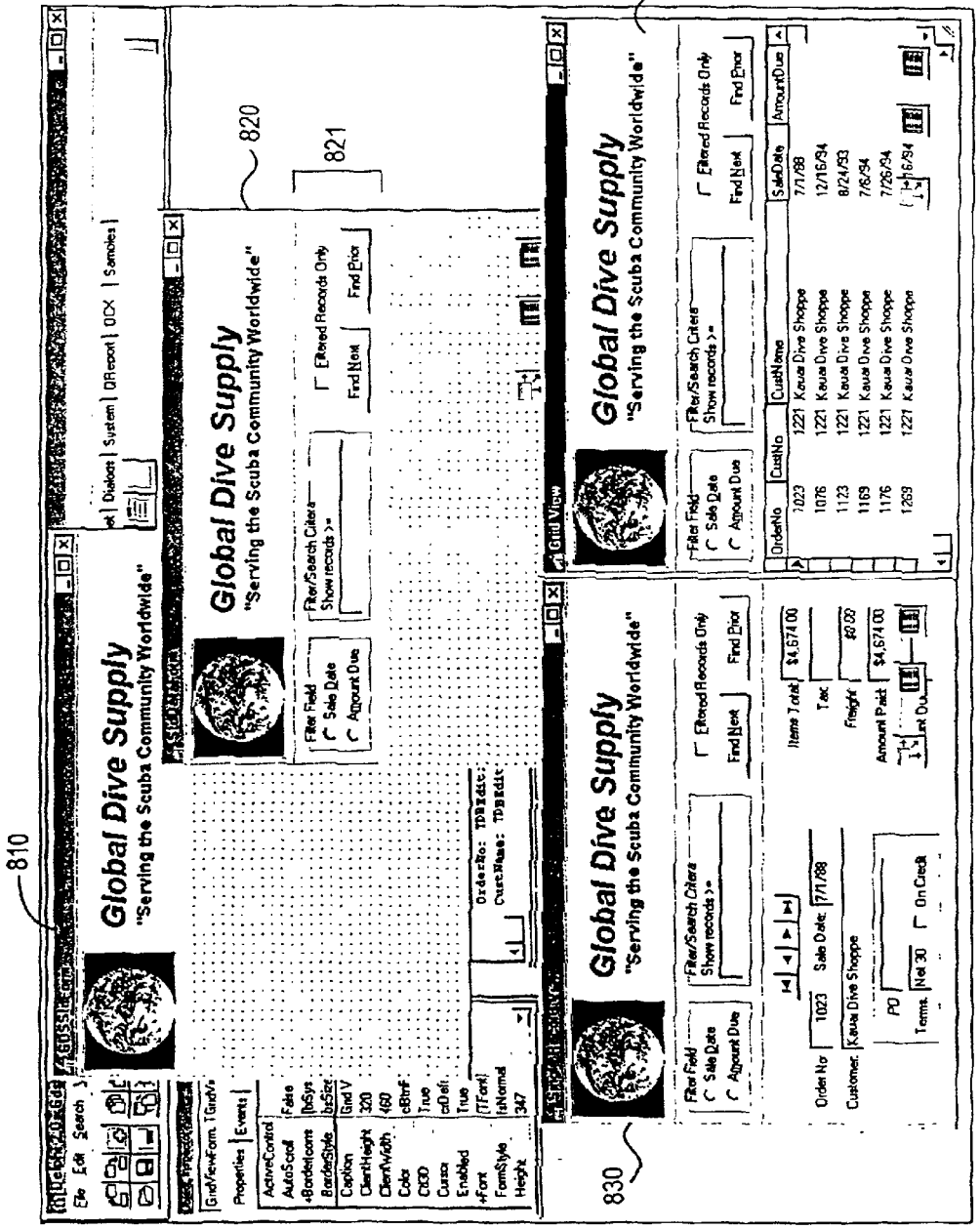
FIGS. 8A–B are bitmap screenshots illustrating use of form inheritance for a complicated form, one including several components.

FIG. 8A illustrates a scenario where the user has created a standard corporate Form 810 having standard elements (e.g., company name plus bitmap logo). This represents a company-standard form for a hypothetical company, Global Dive Supply. Form 820 inherits from Form 810. Accordingly, Form 820 displays the company name and logo set forth in the ancestor Form 810. Additionally, Form 820 includes new components 821 added by the user. The components 821 provide standard searching/filtering techniques for the company data (e.g., customer list). The components 821 include all the logic (method steps) for performing the searching/filtering functionality.

Form 830 and Form 835 inherit from Form 820. The two forms provide two different presentations of that data. Form 830 provides a single record view presentation; Form 835 provides a grid or table view presentation. Since these new components are being added to the descendant Form 820, they do not affect the ancestor Form 810. Since Form 820 inherits from Form 810, the Forms 830, 835 inherit indirectly from Form 810. Accordingly, the Forms 830, 835 inherit the company name and logo (from ancestor 810). Additionally, these forms inherit the components added by their immediate ancestor form—that is, components 821 of immediate ancestor Form 820. Each of the Forms 830, 835 can, in turn, add additional components without affecting the ancestors.

As thus illustrated, form inheritance can continue to an arbitrary level, with each level adding its own particular objects for inheritance by subsequent levels. Although each form displays a separate bitmap image, the system stores only a single copy once in the program. That single copy is stored with the ancestor form (810). With each successive child, only the differential which is necessary is stored.

Figure 8B:
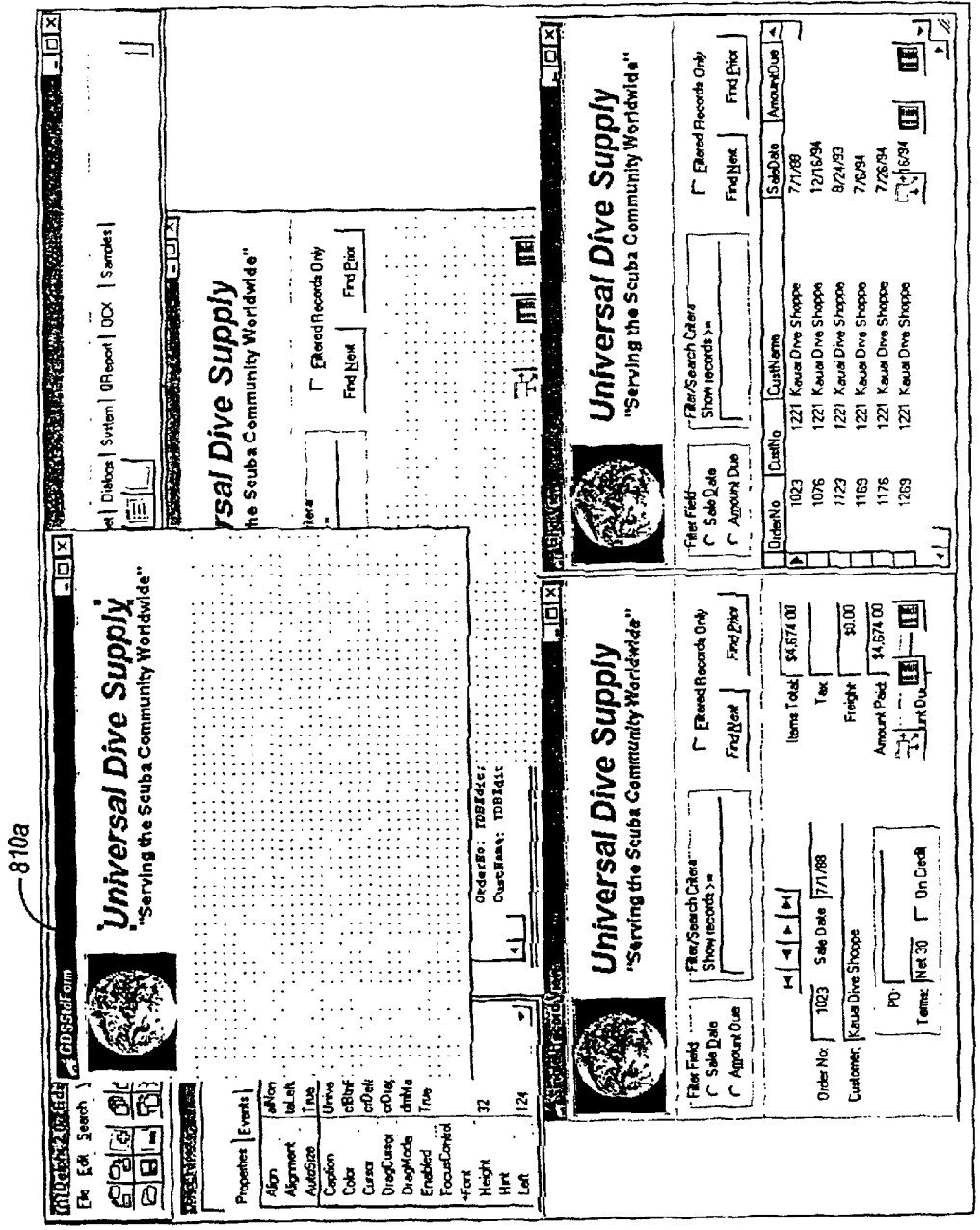

FIG. 8B demonstrates the flexibility afforded by form inheritance for the corporate form. Suppose the company decides to change its name to "Universal Dive Supply." As illustrated by the base Form 810 (shown as 810a), all forms can be updated with the new company name by simply changing a single ancestor form. By the user simply editing this text object in the base form, all descendant forms are automatically updated, without further intervention on the part of the user. In other words, by simply editing the ancestor, the change is automatically propagated to all descendants.

Developers often wish to reuse code for other purposes, and it maybe that portions of a form might be useable on a new form that is to have a different parent, or in a different project. In this situation, the frame component container provides additional flexibilty. It should be recognized that while visual form inheritence permits new forms to acquire by inheritance the objects and properties of an ancestor level, a new form cannot acquire only a portion of another form. Nevertheless, there are arrangements of objects and interrelationships that can be used across several forms in one application, or among several applications and the frame component container that can be included into a new or existing form, including a form that has inherited objects and properties from other forms. Moreover, the frame component container can be shared with other developers either by including the frame into the object repository (e.g., by a conventional right-click operation selection from a pop-up menu) or by distributing the frame's unit (.PAS) and form (.DFM) files which can be added to the component palette if desired.

Figure 8C:
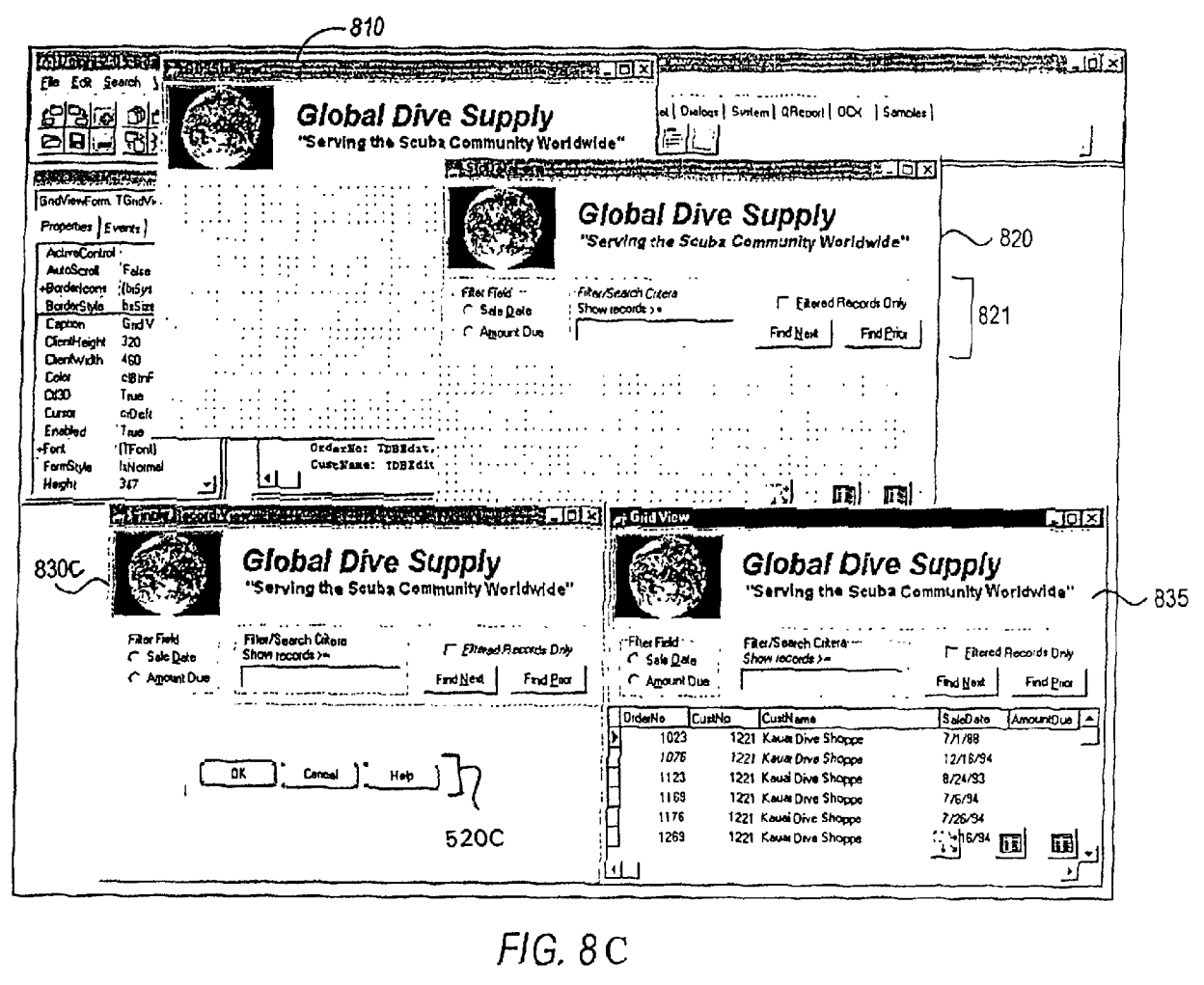

With reference now to FIG. 8C, an arrangement of buttons 520C has been included on the form 830C. The buttons and their properties can be added by the developer in a conventional manner, for example, by selecting button objects from the component palette and setting their respective properties and events. However, in accordance with the presently preferred embodiment, the illustrated button arrangement is included into the form 830C without manual re-coding by placing a frame (i.e., a frame component container) onto the form 830C. Thus, the arrangement of buttons 520C has been predefined in a frame component container such as frame component container 430A of FIG. 4D. The selection of objects to include in the frame, and their respective properties and event handlers are established within the frame definition itself in the same manner that objects are defined when used in a form, for example, Form 501 described above.

A defined frame can be embedded into the form 830C in a single operation rather than requiring manual coding as described in connection with FIGS. 5–6 above. The embedding step requires onlythat an object defined by the frame component container 430A be declared on the form 830X. Any changes that are made to the elements in the declared object 520C do not effect the frame component container definition, but will propagate to any successor frames or forms that inherit from form 830C. The source file for the project containing the changed frame will be incorporated into the declared objects upon recompiling the project.

It is contemplated that forms can be more efficiently constructed by utilizing frames since frames do not require the developer to change any code that has been inherited in a descendant form (either by deleting code or "commenting" it out). Rather, the developer can select a suitable form template for a particular project and then engraft additional functionality from an existing frame or code new functionality into a frame for use in other forms, as the situation dictates.

Internal Operation

A. Overview

Figure 9:
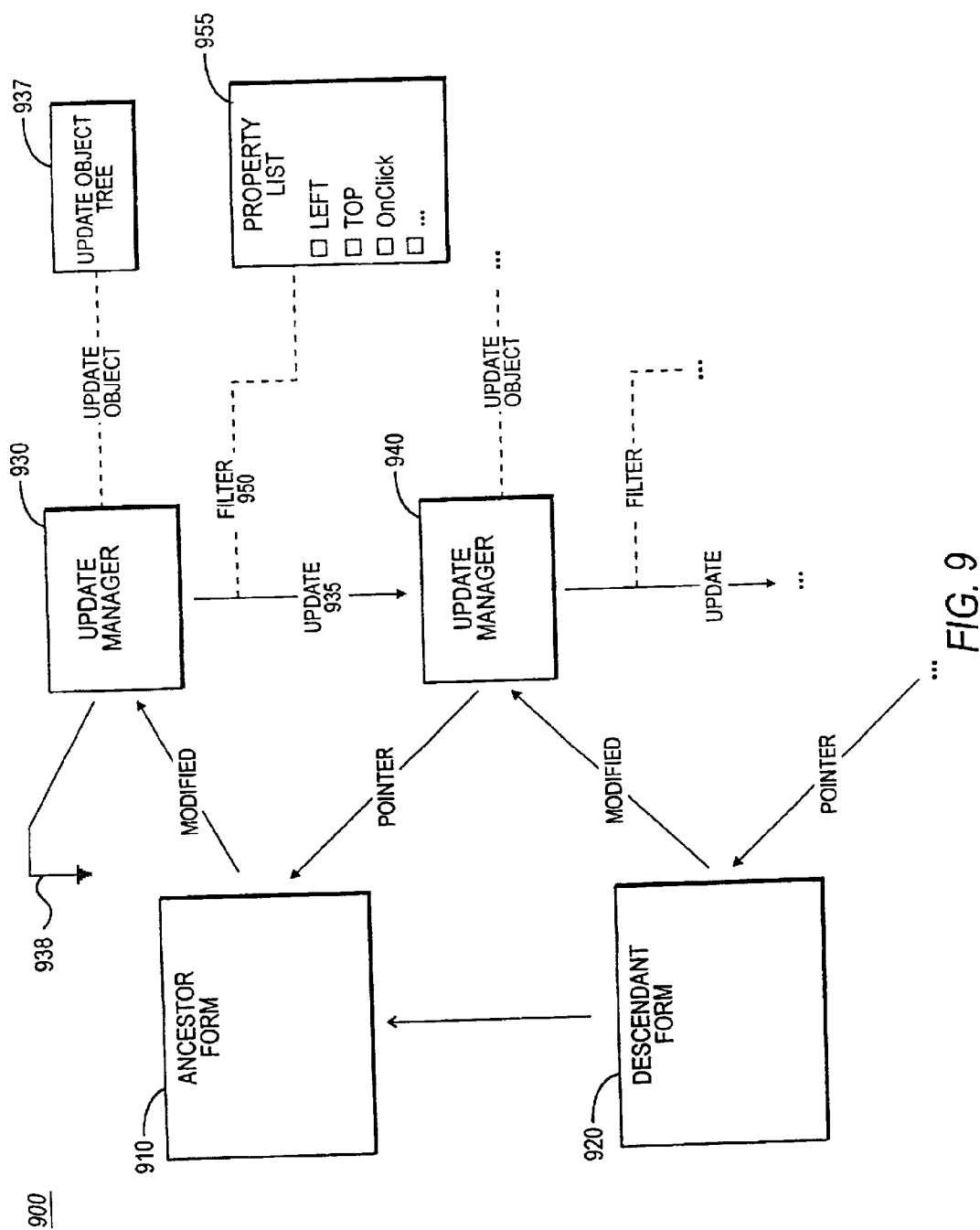
FIG. 9 is a block diagram illustrating internal operation of visual form inheritance.

FIG. 9 is a block diagram 900 illustrating internal operation of visual form inheritance in accordance with the present invention. Frame component containers operate using form inheritance and the following description applies to both frames and forms.

Ancestor form 910 represents an existing form from which one or more descendant forms are derived. Descendant form 920, for instance, descends from ancestor form 910. Internal to the system, each of the forms 910, 920 represents a class managed by the system. In particular, ancestor form 910 represents an instance created from a form class (for the ancestor); descendant form 920 represents an instance from the form class (i.e., descendant class which inherits from the ancestor class).

Conceptually, the relationship between a descendant and its ancestor is maintained via "update managers." The relationship between the descendant form 920 and the ancestor 910, for instance, is maintained by update manager 940. The relationship between the ancestor form 910 and its ancestor, in turn, is maintained by update manager 930. As the ancestor 910 is a base form (i.e., a base class, with no ancestor), the update manager 930 is, in effect, connected to or shorted to "ground" for the ancestor link (shown at 938), thereby indicating to the system that there is no further ancestor.

Whenever a form is modified, a "modified" method fires at the update manager. When the ancestor form 910 is modified, for instance, a "modified" method is invoked in conjunction with the update manager 930. In a similar manner, when the descendant form 920 is modified, a corresponding "modified" method fires or is invoked in conjunction with the update manager 940. This mechanism is implemented through the system's forms designer. Whenever a form is modified, the forms designer, in turn, invokes an appropriate "modified" method for alerting the appropriate update manager that a form has been modified. A given update manager, in turn, invokes a corresponding "update" method for notifying the descendant's update manager that a modification has occurred. In other words, as part of invoking the "modified" method, the system invokes the associated "update" method. When a modified method of an object is invoked, therefore, the object filters "up" and updates "down." In particular, invocation of the modified method fires the "filter" method of the update manager which then proceeds to "filter" the relationship. Also, when the modified method of an ancestor object fires, it will invoke update methods for all of the descendants. When a "modify" method of a descendant fires, it will filter itself with respect to its ancestor and then update all of its children.

Each update manager itself is an instance of an update object and may be viewed as being "owned" by a particular form. For example, the update manager instance 940 is owned by descendant form 920. In this manner, different instances of update managers are linked together in a manner which parallels the inheritance hierarchy of the forms. For every ancestor/descendant relationship which exists in the system, therefore, there exists an update manager for managing their state, in essence "sitting" between the two forms. Each update manager itself maintains pointers to an ancestor form and a descendant form. In the case of ancestor form 910, the corresponding update manager (manager 930) stores a null or Pascal "nil" pointer for the ancestor form. Additionally, each update manager stores a pointer to the next update manager, thereby linking together the update manager objects.

At a high level, each update manager represents a generic mechanism. When ancestor form 910 is modified, for instance, the update manager 930 filters against the ancestor of form 910. Since no ancestor in fact exists (i.e., ancestor link or pointer is nil), no filtering is done. On the other hand, the change to the ancestor form 910 causes the update manager 930 to invoke its update linkage (935), for alerting update manager 940. In essence, the update manager 930 propagates the changes which occurred at the ancestor form 910 to all child (descendant) update managers. For the example shown in FIG. 9, this entails updating a single child update manager 940. The update to the update manager 940 can, in turn, propagate to other descendants, via this update linkage mechanism.

In addition to the update relationship or linkage which exists between managers, another relationship is operating—a filter relationship—as indicated by filter 950. In the face of changes arriving from update manager 930 (as a result of changes from ancestor form 910), update manager 940 applies filter 950 for filtering property values arriving from the ancestor, based on the changes it sees have occurred in the descendant (i.e., property values which have been overridden at the descendant form 920). Suppose, for instance, that descendant form 910 has changed (i.e., overridden) the following properties: caption, left, top, and "OnClick" method. In this case, the filter 950 will "filter" changes from the ancestor update manager (930), so as to exclude these properties (i.e., properties which the descendant has overridden). In other words, the filter 950 excludes or filters those properties which have changed in the descendant, so that such properties are excluded from the update received from the ancestor update manager 930. In this fashion, properties of the ancestor which have been overridden by the descendant are not propagated from the update manager 930 to the update manager 940. In an exemplary embodiment, a filter (i.e., list of properties) in effect goes up one level, but it does not propagate up several levels. An update, on the other hand, can propagate property changes to several levels down (to the extent that any given property has not been filtered at a particular level).

Recall that method pointers are also treated as properties. Accordingly, modification of an event handler (i.e., attaching code or modifying code at a particular form) is treated as if a particular property has changed. For the filter 950, for instance, the code which was added to the "OnClick" event handler for the descendant form 920 serves as an override for that method. Here, the OnClick event handler forms one of the properties listed at the filter 950. Accordingly, the corresponding OnClick event handler from the ancestor form 910 will not execute at the descendant form 920, as it has instead been overridden (and, in effect, filtered as a "method pointer" property).

Since method pointers are treated as property values in the system of the present invention, changes to event handlers can be treated in a fairly generic manner—that is, in a similar manner to how changes to properties are handled. Because method pointers are instance specific (i.e., according to particular methods in memory on a per instance basis), however, some additional treatment is required. It is otherwise treated as if it were a simple property value.

Figure 10:
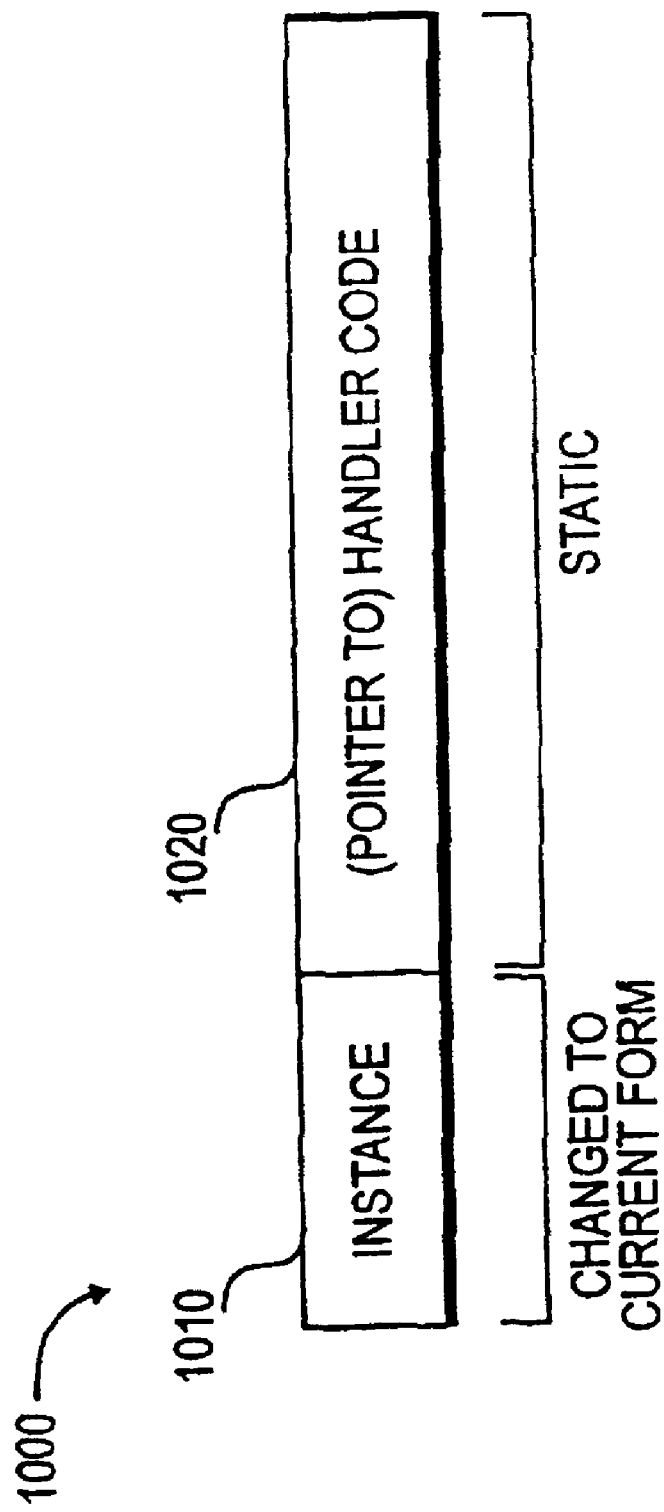
FIG. 10 is a block diagram illustrating treatment of a "method pointer" for propagating an event handler (behavior) from an ancestor to a descendant.

In a preferred embodiment, as a method pointer is propagated, the system strips off the instance (i.e., "this" or "self" pointer) of the ancestor and replaces it with the instance of the propagated-to descendant form. This treatment of a method pointer is illustrated in FIG. 10. The figure illustrates a method pointer 1000 which comprises an instance ("this") pointer 1010 together with a code or function pointer 1020. When a method pointer, such as method pointer 1000, is propagated, the instance or "this" pointer is changed to point to the current form (object). The function or code pointer, on the other hand, is static and, thus, need not be changed.

As indicated in FIG. 9, each update manager is associated with an update object tree—one update object for every component on the corresponding form. In FIG. 9, for instance, the update manager 930 is associated with update object tree 937. A given update object in essence "sits" between its component (of its form) and the corresponding component of the ancestor. The update objects themselves comprise one update object for the form together with one update object for each component on that form. An update manager, on the other hand, can be viewed as a manager of a collection of update objects. Changes which are propagated to an update manager are, in turn, delegated to the update objects controlled by that manager (except when delegating downward towards children).

Each update object itself maintains a list of properties (including those which are filtered) for its component. When "update" or "filter" is invoked, the corresponding update manager delegates the processing to its update objects which are invoked recursively for carrying out the requisite processing. All told, each update object maintains information about what has changed (and what has not changed) for its corresponding component. With this design, the task of saving a descendant is simplified: only those properties which have changed (i.e., changed relative to the ancestor) need be saved.

B. Implementation

1. Update Manager

In an exemplary embodiment, the update manager may be constructed from an update manager class, as follows.

```
{ Update manager }
{ This is the public interface for the update manager }
TUpdateManager = class
private
  FComponentUpdate: TUpdateObject;
  FChildList: TList;
  FComponent, FAncestor: TComponent;
  FParent: TUpdateManager;
  FMode: TUpdateMode;
  FUpdateList: TList;
  FOnUpdating: TNotifyEvent;
  FOnUpdate: TNotifyEvent;
  procedure Filter;
  function GetHasDescendents: Boolean;
  function GetIsDescendent: Boolean;
  procedure UpdateChildren;
  procedure SetChildAncestor (Child: TComponent) ;
  procedure Updating (Component: TComponent) ;
public
  constructor Create (AComponent, AAncestor: TComponent;
  AAncestorManager: TUpdateManager) ;
  destructor Destroy; override;
  // Can the property be reverted (e.g. if it is already the parent's
  // value or it is object and the object's properties need to be
  // reverted individually).
  function CanRevert (Instance: TPersistent; PropInfo: PPropInfo):
  Boolean;
  // Notification transmitted by VCL and forwarded by the form design-
  // er from the form. Lets the update object know when components
  // are deleted so it doesn't hold on to dead pointers.
  procedure Notification (AComponent: TComponent;
  Operation: TOperation) ;
  // Kicks off the update process. When a form is changed it calls
  // Modified which will remove the properties that changed from the
  list
  // of properties to copy from its ancestor when it changes and tell
  // descendents copy the changed properties.
  procedure Modified;
  // Utility to see if a particular name is used by a descendent to
  avoid
  // creating a naming conflict
  function NameExists (const Name: string) : Boolean;
  // Revert a given property to its ancestor's value.
  procedure Revert (Instance: TPersistent; PropInfo: PPropInfo) ;
  // Forces the form to sync with the ancestor. This is called
```

-continued

```
    // automatically when the ancestor is modified but should be done
prior
    // to streaming the descendent to ensure the stream written is
    // accurate.
    procedure Update;
    // Notify any interested party when the updating is happening.
    property OnUpdating: TNotifyEvent read FOnUpdating write
FOnUpdating property OnUpdate: TNotifyEvent read FOnUpdate
write FOnUpdate;
    // The root component (i.e. form) that is being updated.
    property Component: TComponent read FComponent;
    // The ancestor component (i.e. form) for the Component
    property Ancestor: TComponent read FAncestor;
    // True if component has descendents loaded.
    property HasDescendents: Boolean read GetHasDescendents;
    // True if this component has an ancestor.
    property IsDescendent: Boolean read GetIsDescendent;
    end;
```

As shown, the private data members of the class are as follows. The first member, TUpdateObject, is the update object for the form. It represents the root of the tree of update objects. The second data member, FChildList, is a list of child update managers The next two data members, FComponent and FAncestor, represent the descendant and ancestor components, respectively. The FParent data member refers to the parent update object (which may be set to nil). FMode, the next parameter, indicates an update mode; it is used for internal housekeeping (e.g., for indicating "updating" or "filtering").

FUpdateList indicates those components which are being updated; accordingly, it is employed for internal housekeeping during updating operations. The next two data members, FOnUpdating and FOnUpdate, represent notification events. This provides the mechanism whereby the form designer can be notified that updating is occurring.

The private procedures and functions are as follows. The "Filter" procedure filters an ancestor's properties, as previously described. The next two functions, GetHasDescendants and GetIsDescendant, represent "getter" functions—functions which return values stored bythe class. The operation of each is self-evident from the respective function names.

UpdateChildren procedure or method serves to propagate an update call to all children. The next procedure, SetChildAncestor, is employed as a callback procedure or method for allowing the system to easily track what children get created when a component is created. The last private procedure, Updating, is an internal housekeeping method which is invoked on a component which is about to be updated. This call adds a component to the update list and invokes the components own updating method.

The public methods—the external interface—function as follows. The primary method or procedure which is invoked is Modified. This is invoked when the user has made some modification in the forms designer, such as a change to a component's property (e.g., moved the component to a new location). The Modified method is also called when a component is first created. Before a component can actually be created, the update manager confirms that the component being created has a unique name. The name is to be unique not only in the component but also all the descendants of that component. Therefore, the NameExists function confirms that a particular name does not lead to naming conflicts. In a corresponding manner, when a component is deleted, the Notification procedure is invoked for informing the update manager (so that pointers which dereference through the deleted component are no longer employed).

For a descendant whose property value has been overridden, the system provides (for certain property types) the ability to "revert" to the property value of the ancestor. For managing this process, the class defines two methods: Revert and CanRevert. The latter returns a Boolean value indicating whether a property can be reverted. The former reverts a given property to its ancestor's respective value.

Finally, the Update procedure or method is declared public, for allowing the system to force the form to synchronize with its ancestor. This is invoked, for instance, when a form is saved, for ensuring that the form has a valid copy of itself and that all ancestor values have been correctly propagated.

The remaining public members are properties which indicate the internal state of the update manager. These provide a mechanism where properties of the update manager can be easily read.

2. Pairing and Pairings

Before describing the actual Update method for the update manager, it is first helpful to review "pairing" and "pairings" which are represented by class definitions TPairing and TPairings, respectively. A pairing is one ancestor object and one descendent object, where the descendent represents the ansestor object in the descendent. This needs to be discovered since the objects do not point to their ancestors. If an ancestor is found with no corresponding descendent then the ancestor object is new and needs to be created on the descendent. If a descendent is found with no ancestor (and it is marked as having been created from an ancestor) then it was deleted in the ancestor. All other pairings are ignored.

Pairings are created for each ancestor/dependent relation which arises. In the previous example of Form and Form2, for instance, a pairing exists representing the pairing of Form and Form2. Likewise, a pairing exists for related buttons as well. When Update is called, the system creates pairings for respective components of the ancestor and the descendant. For the pairing object, a component was created at the ancestor when a pairing object stores an ancestor value (which is not nil) but a component value which is nil. In other words, this represents a pairing having an ancestor but no descendant.

During operation, the SetAncestor method of the TPairing class is invoked. The method is implemented as follows.

```
procedure TPairing.SetAncestor (Value: TComponent) ;
begin
    FAncestor := Value;
    Children.AddChildren (Value, True) ;
end;
```

As shown, the method invokes an AddChildren method call. The AddChildren method call adds all the children pairings.

The TPairing class also does the work of actually deleting the components which the user has deleted. In particular, this is performed by a DeleteDeleted method, which may be constructed as follows.

```
procedure TPairing.DeleteDeleted;
var
    I: Integer;
begin
    if not Assigned(Ancestor) then
    begin
```

```
              Component.Free;
              FComponent := nil;
              Children.Clear;
         end
       else
              for I := 0 to Children.Count – 1 do
                   Children [I] . DeleteDeleted;
end;
```

In operation, the method first tests whether an ancestor exists for the component. If not, the component is simply deleted; otherwise, the component's children are first deleted (by calling DeleteDeleted method on those children).

The TPairing class is also responsible for creating an update object for valid pairings. The method may be constructed as follows.

```
procedure TPairing.CreateUpdateObjects (ParentObject: TUpdateObject) ;
  var
    I: Integer;
    CurrentObject: TUpdateObject;
  begin
    CurrentObject := nil;
    if New then
    CurrentObject := TUpdateObject.Create (ParentObject,
    Component, Ancestor,
    nil, True)
    else if Children.HasNew then
    CurrentObject := ParentObject. FindChild (Component) ;
    if Children.HasNew then
    for I := 0 to Children.Count – 1 do
    Children [I] .CreateUpdateObjects (CurrentObject) ;
  end;
```

In the instance of a new object, the method creates an update object. The process is repeated for children of that object, by invoking the CreateUpdateObjects method recursively for those children.

3. Update Manager's Update Method

Returning to the description of the update manager, the Update method maybe implemented as follows.

```
       procedure TUpdateManager.Update;
       var
       Pairing: TPairing;
       Stream: TStream;
       Reader: TReader;
       Writer: TWriter;
       { Nested methods - - - removed for clarity of description }
       begin
       if FMode <>umNone then Exit;
       FMode := umUpdate;
       FUpdateList.Clear;
       try
        try
         if Assigned (FOnUpdating) then FOnUpdating (Self) ;
         try
          if Assigned(FAncestor) then
          begin
           Pairing := TPairing.Create(nil); { root pairing }
           try
             Pairing.Component := FComponent;
             Pairing.Ancestor := .FAncestor;
             DeleteDeleted;
             InsertInserted;
             CreateUpdateObjects;
           finally
```
```
            Pairing.Free;
           end;
           FComponentUpdate.Update (Self) ;
          end;
          UpdateChildren; { All children also update }
         finally
          if Assigned(FOnUpdate) then FOnUpdate (Self) ;
         end;
        finally
         FMode := umNone;
        end;
       finally
        CallUpdateds;
       end;
      end;
```

At the outset, the method tests a mode flag, for preventing reentry. If the method does not terminate, the flag is set to "update." Next, the method clears the update list. The "OnUpdating" event is triggered. Actual updating occurs only if an ancestor exists from which to update. A root pairing is created by invoking the Create method of the TPairing class, passing a nil value (i.e., no parent). This is followed by passing FComponent and FAncestor to the pairing. This is followed by deleting the deleted (DeleteDeleted) and inserting the inserted (InsertInserted). These two calls are in turn followed by the CreateUpdateObjects call, which creates any update objects which need to be created. Finally at this point, the pairing structure is freed. The method now updates children, which actually performs the update work.

The InsertInserted method itself may be implemented as follows.

```
procedure InsertInserted;
begin
 Stream := nil;
 Reader := nil;
 Writer := nil;
 try
  DoInsertInserted (TComponent (FComponentUpdate.FObject) ,
  Pairing) ;
  FixupComponents;
 finally
  EndStream;
 end;
end;
```

As shown, the method calls into DoInsertInserted, which is recursive in nature. It may be constructed as follows.

```
procedure DoInsertInserted (AParent: TComponent; Pairing: TPairing) ;
  var
    I: Integer;
  begin
  with Pairing do
  begin
   if Assigned(Ancestor) and not Assigned(Component) then
   begin
    New := True;
    Component := CreateFromAncestor (Aparent, Ancestor) ;
   end;
   for I := 0 to Children.Count – 1 do
   DoInsertInserted(Component, Children [I] ) ;
  end;
end;
```

The DoInsertInserted method traverses the pairing for determining which components need to be created. If an ancestor exists but not a component, then the pairing is new. In such a case, the method creates the component from the ancestor.

The specific method call which performs this task, CreateFromAncestor, maybe constructed as follows.

```
function CreateFromAncestor(Parent, Ancestor: TComponent) :
TComponent; var
ComponentOwner: TComponent;
begin
BeginStream;
Writer.Position := 0
Writer.WriteComponent (Ancestor) ;
Writer.FlushBuffer;
Reader.Position := 0
Reader.FlushBuffer;
Reader.Parent := THack (Parent) .GetChildParent;
Updating (Parent);
ComponentOwner := THack (Parent) .GetChildOwner;
if not Assigned (ComponentOwner) then
ComponentOwner := FComponent;
Result := TComponentClass (Ancestor.ClassType) .
Create (ComponentOwner) ; try
THack (Result) .SetAncestor (True) ;
Reader.ReadComponent (Result) ;
THack (Result) .GetChildren (SetChildAncestor) ;
except
Result.Free;
raise;
end;
end;
```

At the outset, the method calls BeginStream, for ensuring that a stream exists together with a "reader" and a "writer." Both the reader and the writer are provided by the Visual Component Library (VCL) of Borland's Delphi. To create anew component, the system streams out the ancestor to a writer and then streaming it back in using a reader. In other words, a persistent image is streamed out from the ancestor, followed by streaming in a persistent image which now serves as the descendant.

As shown, the CreateFromAncestor method invokes two TComponent methods: the GetChildParent and GetChildOwner methods. In effect, these provide a mechanism for asking the component to indicate its parent and owner (properties). In turn, the method then proceeds to create the component using these values. As this occurs, the method determines the component's children (by calling a GetChildren method), and updates the pairings accordingly. When the CreateFromAncestor method completes, the system returns to the DoInsertInserted method. At this point, the method is invoked recursively for any children. The result is that all new components which were added to any ancestor are correctly propagated to descendants. The Update method of the update manager concludes by invoking two final methods: FixupComponents and EndStream. Both may be constructed as follows.

```
procedure FixupComponents;
begin
    if Reader <>nil then Reader.FixupReferences;
end;
procedure EndStream;
begin
    if Reader <>nil then Reader.EndReferences;
    Reader.Free;
    Writer.Free;
    Stream.Free;
end;
```

The FixupComponents method is an internal housekeeping routine which makes sure that all the pointers are fixed up (which were read in with the stream). Finally, the EndStream method destroys all streams which were created in the process (of update).

4. Update Object (a) Class Definition

An update object, which maintains synchronization between two objects, is created from an TUpdateObject class. In an exemplary embodiment, this class may be constructed as follows.

```
{ TUpdateObject }
{ An update object maintains two objects in sync.
It first compares both objects properties.
Properties that are the same are maintained in a
list for later updating. When the ancestor changes the Update method
is called and all properties in the list that have changed in the
ancestor
are copied to the descendent. If the descendent changes, Filter is
called deleting any properties that are no longer the same as the
ancestors since it would no longer inherit the value from the
ancestor.
TUpdateObject = class
private
FOwner: TUpdateObject;
FObject, FAncestor: TPersistent;
FObjectOwner, FAncestorOwner: TComponent;
FPropList: TList;
FChildList: TList;
FUpdateFiler: TUpdateFiler;
FIsComponent: Boolean;
FIsCollection: Boolean;
FUpdateCollection: Boolean;
FUpdateOrder: Boolean;
FOrder: Integer;
FPropInfo: PPropInfo;
FCompare: Boolean;
constructor Create (AOwner: TUpdateObject; AObject, AAncestor:
TPersistent;
APropInfo: PPropInfo; Compare: Boolean);
destructor Destroy; override;
procedure AddChild (Component: TComponent);
function CanRevert (Instance: TPersistent; PropInfo: PPropInfo;
var Continue: Boolean) : Boolean;
function GetAncestorMethod (PropInfo: PPropInfo) : TMethod;
function GetAncestorPointer (Value: Pointer) : Pointer;
function GetAncestorReference (PropInfo: PPropInfo) : Pointer;
function FindChild (Component: TComponent) : TUpdateObject;
function FindChildProp (APropInfo: PPropInfo) : TUpdateObject;
procedure ComponentDelete (AComponent: TComponent);
procedure Filter;
procedure FilterOrder;
function Revert (Instance: TPersistent; PropInfo: PPropInfo) : Boolean;
procedure Update (UpdateManager: TUpdateManager);
procedure ValidateObjects;
end;
```

The data members are as follows. FOwner is the owning update object. For the root, this is set to nil. For all children objects, the value points to the immediate ancestor or parent update object. The next two data members, FObject and FAncestor, correspond to the object and ancestor (components). The next two data members, FObjectOwner and FAncestorOwner, represent the FObject and FAncestor (components) for the owner.

The FPropList data member stores the property list. The FChildList is a list of all children. The FUpdateFiler is a utility object used for updating. The next two data members, FIsComponent and FIsCollection, are simple Boolean members indicating whether the object is a component or a "collection," respectively. FUpdateCollection and FUpdateOrder, similarly, are Booleans indicating whether the system should update the collection (if the object is a collection) and update order (i.e., creation order), respectively. FOrder is an integer data member indicating the creation order for the object. The FPropInfo data member references property information. For a font object, for instance, the FPropInfo data member allows the system to determine property information for the font. Finally, the FCompare data member is a Boolean indicating whether the system should perform comparison operations (during creation of an object).

After declaring a constructor (Create) and destructor (Destroy), the class defines the following methods. AddChild is a housekeeping method used during creation for adding children. The next method, CanRevert, provides the implementation for the "can revert" feature previously described. The next three methods, GetAncestorMethod, GetAncestorPointer, and GetAncestorReference, are internal housekeeping methods which perform the previously-described method pointer fixup. The FindChild method finds the child update object for the component (associated with the particular update object instance). The FindChildProp method finds an update object for a Propinfo data member. The ComponentDelete method is employed by notification methods for ensuring that invalid pointers are not employed.

The Filter method performs the filtering (i.e., filtering of properties from the ancestor). The FilterOrder method determines whether a descendant has overridden the (creation) order. The Revert method provides the actual implementation for reverting back (to an ancestor's state). The Update method performs the actual work of updating; it represents the work horse routine for the update manager. Finally, the ValidateObjects method is an internal housekeeping method which insures that PropInfo data members point to real objects.

(b) Create Method

The following description will focus on those methods which are helpful for understanding operation of an update object. The Create method, which creates all descendant update objects, may be implemented as follows.

```
constructor TUpdateObject.Create (AOwner: TUpdateObject; AObject,
AAncestor: TPersistent; APropInfo: PPropInfo; Compare: Boolean);
procedure AddNestedObjects;
var
    PropInfo: PPropInfo;
    ORef, ARef: TObject;
    I: Integer;
begin
    for I := 0 to FPropList.Count - 1 do
    begin
        PropInfo := FPropList [I];
        if PropInfo.PropType.Kind = tkClass then
        begin
            ORef := TObject (GetOrdProp (AObject, PropInfo));
            if (ORef <>nil) and not (ORef is TComponent) and
            (ORef is TPersistent) then
            begin
                ARef := TObject (GetOrdProp (AAncestor, PropInfo));
                TUpdateObject.Create(Self, TPersistent (ORef),
                TPersistent (ARef),
                PropInfo, Compare);
            end;
        end;
    end;
end;
begin
    FObject := AObject;
    FAncestor := AAncestor;
    FPropList := TList.Create;
    FChildList := TList.Create;
    FOwner := AOwner;
    FCompare := Compare;
    FUpdateOrder := True;
    FUpdateCollection := True;
```

-continued

```
    FPropInfo := APropInfo;
    if FOwner <>nil then FOwner.FChildList.Add (Self);
    FPropList.Count := GetTypeData (AObject.ClassInfo) A .PropCount;
    GetPropInfos (AObject.ClassInfo, PPropList (FPropList.List) );
    FIsComponent := AObject is TComponent;
    FIsCollection := AObject is TCollection;
    if FIsComponent then
    begin
        FObjectOwner := TComponent (FObject).Owner;
        if FObjectOwner = nil then FObjectOwner :=
        TComponent (FObject);
        FAncestorOwner := TComponent (FAncestor).Owner;
        if FAncestorOwner = nil then FAncestorOwner :=
        TComponent (FAncestor);
    end;
    FUpdateFiler := TUpdateFiler.Create (Self, Compare);
    AddNestedObjects;
    Filter;
    if FIsComponent then THack (FObject).GetChildren (AddChild);
    FilterOrder;
    FCompare : = True;
end;
```

An update object may have two types of children: (1) pointers to components that it owns and (2) pointers to nested properties (e.g., fonts, pens, brushes, and the like). The Create method or constructor creates the various lists and fills in the class data members described above. The constructor also determines whether the object is a component or a collection. If the object is a component, the constructor will determine the owner object and owner ancestor object. The constructor adds nested objects, by invoking a nested procedure, AddNestedObjects, shown above. Finally, the constructor filters itself (based on the object) and then adds any children. The order of the children is filtered, by invoking FilterOrder. The call to GetChildren creates an update object for each child.

(c) Filter Method

The filter method may be implemented as follows.

```
procedure TUpdateObject.Filter;
var
    I: Integer;
    PropInfo: PPropInfo;
begin
    ValidateObjects;
    for I := FPropList.Count - 1 downto 0 do
    begin
        PropInfo := FPropList [I];
        if (PropInfo .GetProc <> nil) and (PropInfo .SetProc <> nil) then
            if FCompare and IsStoredProp (FAncestor, PropInfo) then
            .sup. case PropInfo .PropType .Kind of
                tkInteger, tkChar, tkWChar, tkEnumeration, tkSet:
                    if GetOrdProp (FObject, PropInfo)
                    = GetOrdProp (FAncestor, PropInfo) then
                        Continue;
                tkFloat:
                    if GetFloatProp (FObject, PropInfo)
                    = GetFloatProp (FAncestor, PropInfo) then
                        Continue;
                tkString, tkLString:
                    if GetStrProp (FObject, PropInfo)
                    = GetStrProp (FAncestor, PropInfo) then
                        Continue;
                tkMethod:
                    if MethodsEqual (GetMethodProp (FObject, PropInfo),
                        GetAncestorMethod( PropInfo) ) then
                        Continue;
                tkClass:
                    if (FindChildProp (PropInfo) <> nil) or
                    (Pointer (GetOrdProp (FObject, PropInfo) )
```

```
            = GetAncestorReference( PropInfo) ) then
              Continue;
            .sup. end
          else
            .sup. if PropInfo .PropType .Kind in [tkInteger, tkChar,
          tkWChar,
              tkEnumeration, tkSet, tkFloat, tkString, tkLString,
              tkMethod, tkClass]then
              Continue;
          FPropList.Delete (I);
      end;
      FilterOrder;
      if FIsCollection and FUpdateCollection and FCompare then
          FUpdateCollection := CollectionsEqual (TCollection(FObject),
              TCollection (FAncestor) );
      if FCompare then FUpdateFiler.Filter;
      for I := 0 to FChildList.Count - 1 do
  TUpdateObject (FChildList [I]) .Filter;
  end;
```

At the outset, the Filter method validates its objects, for making sure the method is referencing real objects. Using the runtime type information (RTTI), the method iterates through all of the properties and compares the property of the ancestor with the current component of the update object. If the property values differ, the method deletes the property from the property list. The method then filters the order. If the object is a collection, the method will perform a collection comparison. Thereafter, the method invokes the Filter method for each of its children.

(d) Update Method

The Update method is similar in structure is similar to that of the Filter method. The Filter method will, however, delete properties, whereas the update method will copy them. In an exemplary embodiment, the Update method may be constructed as follows.

```
procedure TUpdateObject.Update (UpdateManager: TUpdateManager);
var
    I: Integer;
    PropInfo: PPropInfo;
    IValue: Integer;
    PValue: Pointer;
    FValue: Extended;
    SValue: string;
    Child: TUpdateObject;
    procedure UpdateOrder;
    var
        I, J: Integer;
        ChildObjects : TChildUpdateObjects;
        Descendent, Ancestor: TUpdateObject;
    begin
        if FIsComponent then
        begin
            ChildObjects := TChildUpdateObjects.Create (Self,
                TComponent (FObject),
                TComponent (FAncestor) );
            try
                J := 0;
                for I := 0 to ChildObjects.DescendentCount - 1 do
                begin
                    Descendent := ChildObjects.Descendents [I];
                    if Descendent <> nil then
                    begin
                        Ancestor := ChildObjects.Ancestors [J];
                        if Ancestor <> Descendent then
                            Ancestor.FOrder := I
                        else
                            Ancestor.FOrder := -1;
                        Inc (J);
                    end;
                end;
                for I : = 0 to ChildObjects.AncestorCount - 1 do
                begin
                    Ancestor := ChildObjects.Ancestors [I];
                    if (Ancestor <> nil) and Ancestor.FUpdateOrder
                        and (Ancestor.FOrder <> -1) then
                        THack(FObject) .SetChildOrder (TComponent
                        (Ancestor.FObject) , Ancestor.FOrder);
                end;
            finally
                ChildObjects.Free;
            end;
        end;
    end;
begin
    ValidateObjects;
    if FIsComponent then UpdateManager.Updating (TComponent
(FObject) );
    for I := 0 to FPropList.Count - 1 do
    begin
        PropInfo := FPropList [I];
        if IsStoredProp (FAncestor, PropInfo) then
            case PropInfo .PropType .Kind of
                tkInteger, tkChar, tkWChar, tkEnumeration, tkSet:
                begin
                    IValue := GetOrdProp(FAncestor, PropInfo);
                    if IValue <> GetOrdProp (FObject, PropInfo) then
                        SetOrdProp (FObject, PropInfo, IValue);
                end;
                tkFloat:
                begin
                    FValue := GetFloatProp (FAncestor, PropInfo);
                    if FValue <> GetFloatProp (FObject, PropInfo) then
                        SetFloatProp (FObject, PropInfo, FValue);
                end;
                tkString, tkLString:
                begin
                    SValue := GetStrProp(FAncestor, PropInfo);
                    if SValue <> GetStrProp (FObject, PropInfo) then
                        SetStrProp (Fobject, PropInfo, SValue);
                end;
                tkMethod:
                    if FIsComponent and
                        not MethodsEqual (GetMethodProp (FObject,
                            PropInfo), GetAncestorMethod(PropInfo) ) then
                        SetMethodProp (FObject, PropInfo,
                            GetAncestorMethod( PropInfo) );
                tkClass:
                begin
                    Child : = FindChildProp (PropInfo);
                    if Child <> nil then
                        Child.Update (UpdateManager)
                    else
                    begin
                        PValue := GetAncestorReference (PropInfo);
                        if PValue <> Pointer (GetOrdProp (FObject, PropInfo))
                            then
                            SetOrdProp (Fobject, PropInfo, Longint (PValue) );
                    end;
                end;
            end;
    end;
    FUpdateFiler.Update;
    UpdateOrder;
    if FIsCollection and FUpdateCollection then
        TCollection (FObject) .Assign (TCollection (FAncestor) );
    for I := FChildList.Count - 1 downto 0 do
      with TUpdateObject (FChildList [I]) do
        if FPropInfo = nil then Update (UpdateManager);
end;
```

As shown, the method includes a nested procedure: UpdateOrder. The steps of the Update method itself are as follows. After validating objects and notifying the update manager of an update, the method enters a case statement which switches on the property type (using runtime type information). For each case arm, the method requests the value for the ancestor property and then compares it against the value for the object. The property of the object is set to that of the ancestor, unless it has been overridden. Thereafter, the method invokes the UpdateFiler update method for updating non-type info properties. This is followed by updating the order of components. If the object is a collection, the method assigns the ancestor collection into the collection of the object. Finally, the method instructs the update objects of all the children to update themselves.

Appended herewith as Appendix A are source listings in Object Pascal providing further description of the present invention. A suitable compiler/linker for Object Pascal is provided by the abovementioned Delphi.™., available from Borland International, Inc. of Scotts Valley, Calif.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A method for rapid incorporation of changes to a project, the project including at least first and second forms, comprising the steps of:
   a) embedding into each of the first and second forms a respective object derived from a frame component container;
   b) changing the frame component container; and
   c) automatically including by inheritance the changes that were made to the frame component container into a source file of the first and second forms, wherein the changes are included into the derived object during design time,
   whereby all instances of the object derived from the frame component container are synchronized on a display with any changes that were made to the frame component container.

2. The method as in claim 1, wherein the first and second forms inherit their properties from different parents.

3. The method as in claim 1, wherein the frame component container is defined independent of any form.

4. The method of claim 1, wherein the frame component container is defined independent of the first and second forms.

5. A method for rapid incorporation of changes to multiple, discrete projects each including at least a first form, comprising the steps of:
   a) embedding into the first form of each project a respective object derived from a frame component container;
   b) changing the frame component container; and
   c) automatically including by inheritance the changes that were made to the frame component container into a source file of the first form of each project, wherein the changes are included into the derived object during design time,
   whereby all instances of the object derived from the frame component container are synchronized on a display with any changes that were made to the frame component container.

6. The method of claim wherein 5, the frame component container is defined independent of the at least first form.

7. In a form-based development system, a method for assisting a user with creating an application program, the method comprising:
   creating an ancestor frame comprising a set of components, each component having a set of properties;
   embedding at least one descendant frame into a form, said descendant frame having a set of components inherited from the ancestor frame;
   modifying said at least one descendant frame by overriding a value stored for at least one property;
   storing said at least one descendant frame by storing values for only those properties which have been overridden;
   modifying at least one component of said ancestor frame;
   in response to said modifying step, propagating a property value from each property which has been modified to all said at least one descendant frame; and
   synchronizing on a display all said at least one descendant frame with any modifications to said at least one component of said ancestor frame.

8. The method of claim 7, further comprising:
   filtering propagation of any property which has already been overridden by modifying its value at said at least one descendant frame.

9. The method of claim 7, wherein said creating an ancestor frame includes:
   displaying a component palette including components which the user can select; and
   receiving user input for placing components selected from the palette in the ancestor frame.

10. The method of claim 7, wherein said step of inheriting said set of components from the ancestor frame includes:
    for each component of the ancestor, creating a corresponding component at a descendant, each component including property values derived from a corresponding ancestor component at the ancestor frame.

11. The method of claim 10, wherein each derived component includes a unique name so that the component can be uniquely identified in a hierarchy of descendant forms.

12. The method of claim 7, wherein said set of properties includes properties specifying position and size for a component.

13. The method of claim 7, wherein said set of properties includes a property comprising a bitmap image.

14. The method of claim 7, wherein a particular component is associated with an event handler which processes an event occurring at the component.

15. The method of claim 14, wherein each component which inherits from the particular component inherits said event handler.

16. The method of claim 7, further comprising:
    deleting an existing component from the ancestor frame; and
    in response to said deleting step, deleting at each descendant frame a corresponding existing component.

17. The method of claim 7, wherein said overriding a value stored for at least one property includes:
    receiving user input specifying a new value for a selected property.

18. The method of claim 7, wherein the ancestor frame is defined independent of the at least one descendant frame.

19. In a form-based development system, a method for assisting a user with creating an application program, the method comprising:
    creating an ancestor frame comprising a set of components, each component having a set of properties;
    embedding at least one descendant frame into a form, said descendant frame having a set of components inherited from the ancestor frame;

modifying said at least one descendant frame by overriding a value stored for at least one property;

storing said at least one descendant frame by storing values for only those properties which have been overridden;

modifying a component of the ancestor frame;

in response to said modifying step, notifying each component of a descendant frame which inherits from the modified component of the modification;

synchronizing on a display all said at least one descendant frame with any modifications to said at least one component of said ancestor frame; and in response to receiving a notification of the modification, updating each notified component of a descendant frame with values for those properties of the ancestor which have not been overridden at the descendant frame.

20. The method of claim 19, wherein the ancestor frame is defined independent of the at least one descendant frame.

21. In a form-based development system, a method for assisting a user with creating an application program, the method comprising:

creating an ancestor frame comprising a set of components, each component having a set of properties;

embedding at least one descendant frame into a form, said descendant frame having a set of components inherited from the ancestor frame;

modifying said at least one descendant frame by overriding a value stored for at least one property;

storing said at least one descendant frame by storing values for only those properties which have been overridden;

creating a new component at the ancestor frame;

synchronizing on a display all said at least one descendant frame with any modifications to said at least one component of said ancestor frame; and in response to said creating step, creating at each descendant a corresponding new component.

22. The method of claim 21, wherein each corresponding component created at a descendant initially includes properties having values identical to values of corresponding properties of the ancestor component.

23. The method of claim 21, wherein the ancestor frame is defined independent of the at least one descendant frame.

24. A development system comprising:

a computer having a processor and a memory;

an interface for creating frame objects having components;

means for creating a descendant frame object from an ancestor frame object, said means including means for automatically propagating to each descendant frame object so created modifications which occur at said ancestor frame object; and means for synchronizing on a display all said at least one descendant frame with any modifications to said at least one component of said ancestor frame, wherein said means for automatically propagating includes means for notifying a descendant frame object that its corresponding ancestor frame object has been modified.

25. The system of claim 24, wherein each descendant frame object created comprises components having at least some properties which are identical to properties of corresponding components of the ancestor frame object.

26. The system of claim 25, wherein each component has a name which uniquely identifies that component.

27. The system of claim 24, wherein said means for automatically propagating includes:

means for filtering properties of the corresponding ancestor frame object so that only properties which have not been overridden at the modified descendant frame object are propagated.

28. The system of claim 24, wherein said ancestor frame object is a frame component container.

29. The system of claim 24, wherein said ancestor frame object is created independent of any form.

* * * * *